United States Patent
Hosoda

Patent Number: 6,116,638
Date of Patent: Sep. 12, 2000

[54] AIRBAG SYSTEM AND PASSENGER RESTRAINT SYSTEM FOR VEHICLE

[75] Inventor: Koji Hosoda, Hiroshima-ken, Japan

[73] Assignee: Mazda Motor Corp., Hiroshima, Japan

[21] Appl. No.: 09/013,426

[22] Filed: Jan. 26, 1998

[30] Foreign Application Priority Data

Jan. 30, 1997 [JP] Japan .................................. 9-016724

[51] Int. Cl.[7] .............................. B60R 21/32; B60D 1/28
[52] U.S. Cl. ........................................... 280/735; 180/271
[58] Field of Search .................................. 280/735, 734; 701/45, 46; 307/10.3, 10.6; 180/268, 270, 271, 273

[56] References Cited

U.S. PATENT DOCUMENTS

| | | | |
|---|---|---|---|
| 4,381,829 | 5/1983 | Montaron | 180/274 |
| 4,958,851 | 9/1990 | Behr et al. | 280/735 |
| 5,172,790 | 12/1992 | Ishikawa et al. | |
| 5,454,591 | 10/1995 | Mazur et al. | |
| 5,474,327 | 12/1995 | Schousek | 280/735 |
| 5,690,356 | 11/1997 | Lane, Jr. | |
| 5,835,873 | 11/1998 | Darby et al. | 701/45 |
| 5,851,026 | 12/1998 | Schoos et al. | |
| 5,882,035 | 3/1999 | Munro | |

FOREIGN PATENT DOCUMENTS

| | | |
|---|---|---|
| 4-52956 | 5/1992 | Japan |
| 7-165011 | 6/1995 | Japan |
| 10-194076 | 7/1998 | Japan |
| 10-194080 | 7/1998 | Japan |

*Primary Examiner*—Paul N. Dickson
*Assistant Examiner*—Faye M. Fleming

[57] ABSTRACT

In an airbag system for a vehicle, when the state of a passenger at a front passenger seat (including the attached state of a child seat) can be detected, airbags are controlled on the basis of the detection state (S19, S21), and that detection state is stored in a RAM (S23). When it is detected that one of "position offset" of the child seat, "input signal abnormality", "hardware error", and passenger detection sensor failure has occurred at the front passenger seat (S12–S15), the contents of the RAM are referred to, and the airbags and the like are controlled on the basis of the sensor state one cycle before that state has been detected (S22).

24 Claims, 32 Drawing Sheets

(WHEN CHILD SEAT FACES FRONT)

(WHEN CHILD SEAT FACES REAR)

| PASSENGER DETECTION \ C·S DETECTION | PASSENGER DETECTION | | | | | | PASSENGER NON-DETECTION | | | | | | PASSENGER DETECTION SENSOR FATAL FAILURE | | | | | |
|---|---|---|---|---|---|---|---|---|---|---|---|---|---|---|---|---|---|---|
| | A·B CONTROL | | INDICATION LAMP | | S·B CONTROL | | A·B CONTROL | | INDICATION LAMP | | S·B CONTROL | | A·B CONTROL | | INDICATION LAMP | | S·B CONTROL | |
| | FRONT PASSEN-GER SEAT | SIDE | STATUS | WARN-ING | P·T | L·L | FRONT PASSEN-GER SEAT | SIDE | STATUS | WARN-ING | P·T | L·L | FRONT PASSEN-GER SEAT | SIDE | STATUS | WARN-ING | P·T | L·L |
| C·S POSITION OFFSET | × | × | ON | ON | × | × | × | × | ON | ON | × | × | × | × | ON | ON | × | × |
| INPUT SIGNAL ABNORMALITY | × | × | ON | ON | × | × | × | × | ON | ON | × | × | × | × | ON | ON | × | × |
| HARDWARE ERROR | × | × | ON | ON | × | × | × | × | ON | ON | × | × | × | × | ON | ON | × | × |
| FRONT-FACING C·S DETECTION | ○ | × | OFF | OFF | ○ | ○ | ○ | × | OFF | OFF | ○ | ○ | ○ | × | OFF | ON | ○ | ○ |
| REAR-FACING C·S DETECTION | × | × | ON | OFF | × | × | × | × | ON | OFF | × | × | × | × | ON | ON | × | × |
| C·S ABSENCE | ○ | ○ | OFF | OFF | ○ | ○ | × | × | ON | OFF | ○ | × | ○ | ○ | ON | ON | ○ | ○ |

( ○ : INFLATION PERMISSION, OPERATION PERMISSION,
× : INFLATION INHIBITION, OPERATION INHIBITION )

| PASSENGER DETECTION \ C·S DETECTION | PASSENGER DETECTION | | | | | | PASSENGER NON-DETECTION | | | | | | PASSENGER DETECTION SENSOR FATAL FAILURE | | | | | |
|---|---|---|---|---|---|---|---|---|---|---|---|---|---|---|---|---|---|---|
| | A·B CONTROL | | INDICATION LAMP | | S·B CONTROL | | A·B CONTROL | | INDICATION LAMP | | S·B CONTROL | | A·B CONTROL | | INDICATION LAMP | | S·B CONTROL | |
| | FRONT PASSENGER SEAT | SIDE | STATUS | WARNING | P·T | L·L | FRONT PASSENGER SEAT | SIDE | STATUS | WARNING | P·T | L·L | FRONT PASSENGER SEAT | SIDE | STATUS | WARNING | P·T | L·L |
| C·S POSITION OFFSET | × | × | ON | ON | × | × | × | × | ON | ON | × | × | × | × | ON | ON | × | × |
| INPUT SIGNAL ABNORMALITY | × | × | ON | ON | × | × | × | × | ON | ON | × | × | × | × | ON | ON | × | × |
| HARDWARE ERROR | × | × | ON | ON | × | × | × | × | ON | ON | × | × | × | × | ON | ON | × | × |
| FRONT-FACING C·S DETECTION | ○ | ○ | OFF | OFF | ○ | ○ | ○ | ○ | OFF | OFF | ○ | ○ | ○ | ○ | OFF | ON | ○ | ○ |
| REAR-FACING C·S DETECTION | × | × | ON | ON | × | × | × | × | ON | OFF | × | × | × | × | ON | ON | × | × |
| C·S ABSENCE | ○ | ○ | OFF | OFF | ○ | ○ | ○ | ○ | OFF | OFF | ○ | ○ | ○ | ○ | OFF | ON | ○ | ○ |

( ○: INFLATION PERMISSION, OPERATION PERMISSION,
×: INFLATION INHIBITION, OPERATION INHIBITION )

FIG. 14

| PASSENGER DETECTION \ C·S DETECTION | PASSENGER DETECTION | | | | | | PASSENGER NON-DETECTION | | | | | | PASSENGER DETECTION SENSOR FATAL FAILURE | | | | | |
|---|---|---|---|---|---|---|---|---|---|---|---|---|---|---|---|---|---|---|
| | A·B CONTROL | | INDICATION LAMP | | S·B CONTROL | | A·B CONTROL | | INDICATION LAMP | | S·B CONTROL | | A·B CONTROL | | INDICATION LAMP | | S·B CONTROL | |
| | FRONT PASSENGER SEAT | SIDE | STATUS | WARNING | P·T | L·L | FRONT PASSENGER SEAT | SIDE | STATUS | WARNING | P·T | L·L | FRONT PASSENGER SEAT | SIDE | STATUS | WARNING | P·T | L·L |
| C·S POSITION OFFSET | × | × | OFF | ON | × | × | × | × | OFF | ON | × | × | × | × | OFF | ON | × | × |
| INPUT SIGNAL ABNORMALITY | × | × | OFF | ON | × | × | × | × | OFF | ON | × | × | × | × | OFF | ON | × | × |
| HARDWARE ERROR | × | × | OFF | ON | × | × | × | × | OFF | ON | × | × | × | × | OFF | ON | × | × |
| FRONT-FACING C·S DETECTION | ○ | ○ | OFF | OFF | ○ | ○ | ○ | ○ | OFF | OFF | ○ | ○ | ○ | ○ | OFF | ON | ○ | ○ |
| REAR-FACING C·S DETECTION | × | × | ON | OFF | × | × | × | × | ON | OFF | × | × | × | × | OFF | ON | × | × |
| C·S ABSENCE | ○ | ○ | OFF | OFF | ○ | ○ | ○ | ○ | OFF | OFF | ○ | ○ | ○ | ○ | OFF | ON | ○ | ○ |

(○: INFLATION PERMISSION, OPERATION PERMISSION,
×: INFLATION INHIBITION, OPERATION INHIBITION)

FIG. 15

| PASSENGER DETECTION \ C·S DETECTION | PASSENGER DETECTION | | | | | | PASSENGER NON-DETECTION | | | | | | PASSENGER DETECTION SENSOR FATAL FAILURE | | | | | |
|---|---|---|---|---|---|---|---|---|---|---|---|---|---|---|---|---|---|---|
| | A·B CONTROL | | INDICATION LAMP | | S·B CONTROL | | A·B CONTROL | | INDICATION LAMP | | S·B CONTROL | | A·B CONTROL | | INDICATION LAMP | | S·B CONTROL | |
| | FRONT PASSENGER SEAT | SIDE | STATUS | WARNING | P·T | L·L | FRONT PASSENGER SEAT | SIDE | STATUS | WARNING | P·T | L·L | FRONT PASSENGER SEAT | SIDE | STATUS | WARNING | P·T | L·L |
| C·S POSITION OFFSET | × | × | ON | ON | × | × | × | × | ON | ON | × | × | × | × | ON | ON | × | × |
| INPUT SIGNAL ABNORMALITY | × | × | ON | ON | × | × | × | × | ON | ON | × | × | × | × | ON | ON | × | × |
| HARDWARE ERROR | × | × | ON | ON | × | × | × | × | ON | ON | × | × | × | × | ON | ON | × | × |
| FRONT-FACING C·S DETECTION | ○ | ○ | OFF | OFF | ○ | ○ | ○ | ○ | OFF | OFF | ○ | ○ | ○ | ○ | OFF | ON | × | ○ |
| REAR-FACING C·S DETECTION | × | × | ON | OFF | × | × | × | × | ON | OFF | × | × | × | × | ON | ON | × | × |
| C·S ABSENCE | ○ | ○ | OFF | OFF | ○ | ○ | ○ | ○ | OFF | OFF | ○ | ○ | ○ | ○ | OFF | ON | × | ○ |

( ○: INFLATION PERMISSION, OPERATION PERMISSION,
×: INFLATION INHIBITION, OPERATION INHIBITION )

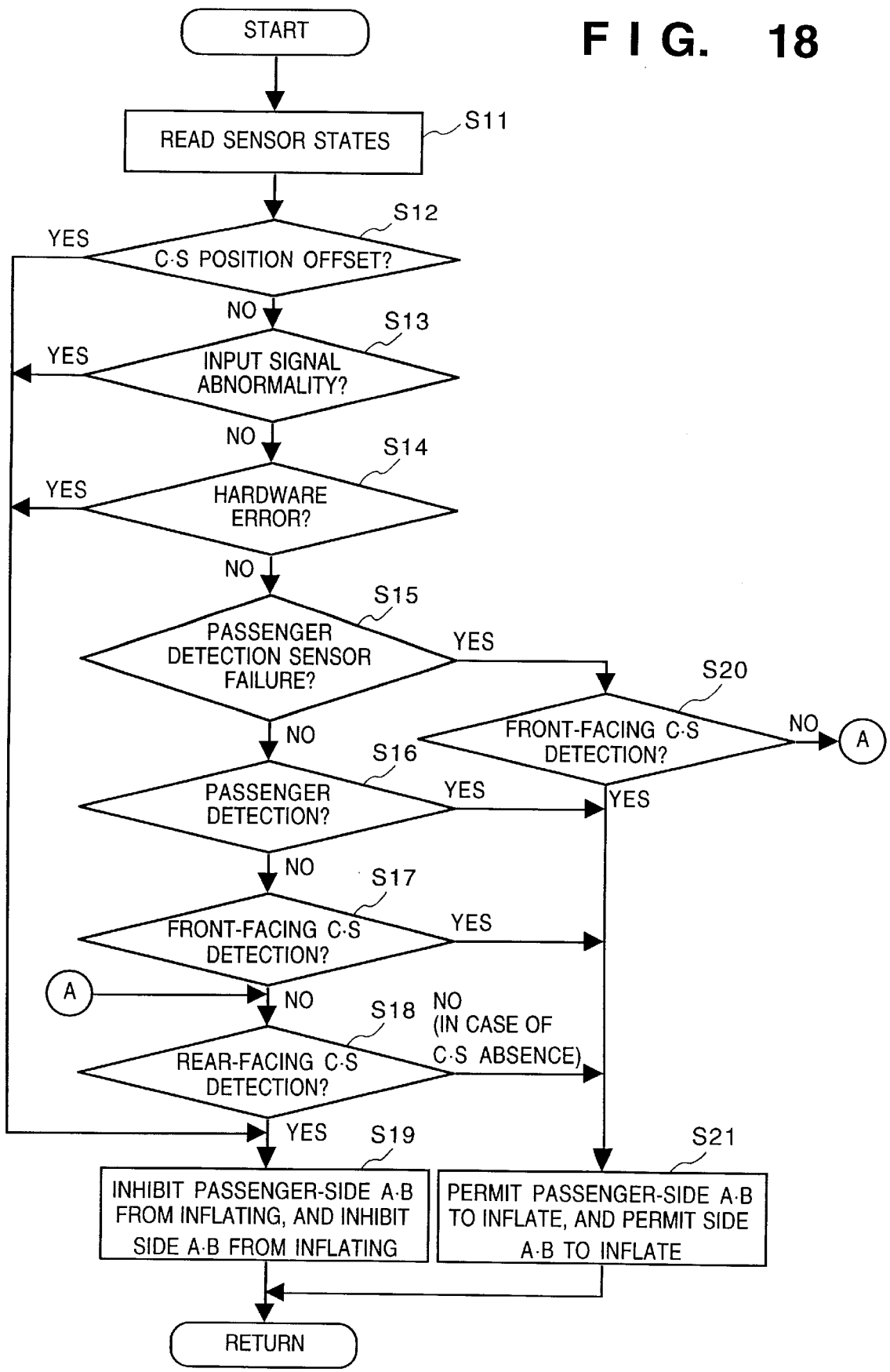

(INITIAL STATE)

(CLAMP LOCK STATE)

(CLAMP LOCK STATE)

AIRBAG SYSTEM AND PASSENGER RESTRAINT SYSTEM FOR VEHICLE

BACKGROUND OF THE INVENTION

The present invention relates to an airbag system and a passenger restraint system for a vehicle and, more particularly, to an airbag system and a passenger restraint system for an automobile as a typical vehicle.

In recent years, automobiles as a typical vehicle have been increasingly popularly equipped with both driver- and passenger-side airbag systems. In order to attain fail safe of such airbag systems, for example, Japanese Utility Model Laid-Open No. 4-52956 discloses a method of always permitting airbags to inflate when a passenger detection sensor used for inflation control of airbags has failed. These airbag systems need to properly inflate in car crashes, but must not needlessly inflate in the absence of such emergencies in terms of labor and cost since exchange and adjustment are required once they have inflated. In the control of such airbag systems, it is important in, especially, the inflation control of the passenger-side airbag to check whether or not a passenger is sitting in the front passenger seat unlike the driver-side airbag, since often no passenger sits in the front passenger seat. In a vehicle equipped with a passenger-side airbag, another problem is posed in its inflation control when a so-called child seat for an infant is attached to the front passenger seat. When a child seat is attached facing front to the front passenger seat, the passenger-side airbag must be permitted to inflate, but when a child seat is attached facing rear, the passenger-side airbag must be inhibited from inflating since shocks to the child seat and an infant who is sitting in that child seat upon inflation of the passenger-side airbag must be prevented.

As a method of solving this problem, for example, Japanese Patent Laid-Open No. 7-165011 discloses a method of detecting the presence/absence of a child seat via communications with the child seat by arranging a transmission/reception mechanism in a seat.

The present applicants proposed a method associated with inflation control of a passenger-side airbag and signaling to a passenger in previous Japanese Patent Application Nos. 9-2130 and 9-2134, as a detailed and concrete method of solving the above-mentioned problem. These Japanese Patent Applications were filed in Japan on Jan. 9, 1997, which are not opened at present. Note, the Japanese Patent Application No. 9-2130 was filed on Jan. 7, 1998 as U.S. patent application Ser. No. 09/003,819 now U.S. Pat. No. 6,007,094 (inventor: HIROSHI HOSODA) corresponding to issued U.S. Pat. No. 6,007,094.

In order to assure higher safety, not only driver- and passenger-side airbags, but also so-called side airbags that can relax shocks from the sides of a vehicle onto passengers are required to be attached. Furthermore, in recent years, in order to attain both relaxation of restrained feeling experienced by a passenger in an ordinary state and secure restraint in an emergency state, a so-called seatbelt pretensioner for restraining a passenger by pulling in a seatbelt upon detecting shocks, and a so-called seatbelt load limiter for relaxing shocks onto the passenger by forming slack of the seatbelt in car crash have been developed.

SUMMARY OF THE INVENTION

It is an object of the present invention to improve the method associated with inflation control of a passenger-side airbag in the previous proposal of the present applicants, and to provide an airbag system and a passenger restraint system for a vehicle, which can realize safety-guaranteed, appropriate inflation & operation control even when the passenger state cannot be detected.

In order to achieve the above object, an airbag system according to the present invention is characterized by the following arrangement.

That is, there is provided an airbag system for a vehicle, which comprises state detection means for detecting a state of a passenger at a vehicle seat by a sensor, and control means for controlling an inflation of an airbag for the vehicle seat in accordance with an output of the sensor obtained via the state detection means, comprising failure detection means for detecting a failure of the sensor, wherein when the failure detection means detects a failure of the sensor and informing the detection state to the state detection means, the control means holds an output of the sensor in a state before failure detection, and controls the airbag on the basis of the held state.

The state detection means preferably includes child seat detection means for detecting whether or not a child seat is attached, and the state of the passenger preferably includes the presence/absence of the child seat.

Furthermore, the state detection means preferably includes determination means for determining an attachment direction of the child seat, and the state of the passenger preferably includes the direction of the child seat.

With such arrangement, when the sensor has failed, the airbag is controlled based on the state before failure detection, thus assuring high fail safe performance.

There is also provided an airbag system for a vehicle, which comprises control means for, when attachment of a child seat on a vehicle seat is detected in accordance with an output of a sensor for detecting attachment of the child seat to the vehicle seat, inhibiting an airbag for the vehicle seat from inflating, comprising failure detection means for detecting the failure of a sensor, wherein when the failure detection means detects a failure of the sensor and informing the detection state to the control means, the control means holds an output obtained from the sensor upon attachment of the child seat before the failure detection, and inhibits the airbag from inflating.

With this arrangement, even when the sensor failure has occurred while the child seat is attached, high fail safe performance can be assured.

For example, the control means preferably inhibits the airbag from inflating for a predetermined period of time after an ignition switch of the vehicle is turned on.

With this arrangement, a passenger can be prevented from being injured by the airbag that may be inflated during a time period after the operation of the ignition switch, in which period normally the state of the passenger and the attachment of the child seat have not been settled.

In order to achieve the above object, these arrangements may be applied to a seatbelt pretensioner and/or seatbelt load limiter of a passenger restraint system for a vehicle.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 10 is a table for explaining control according to the first embodiment of the present invention;

FIG. 11 is a table for explaining control according to the second embodiment of the present invention;

FIG. 12 is a table for explaining control according to the third embodiment of the present invention;

FIG. 13 is a table for explaining control according to the fourth embodiment of the present invention;

FIG. 14 is a table for explaining control according to the fifth embodiment of the present invention;

FIG. 15 is a table for explaining control according to the sixth embodiment of the present invention;

FIG. 18 is a flow chart showing airbag control according to the first embodiment of the present invention;

DETAILED DESCRIPTION OF THE PREFERRED EMBODIMENTS

Figure 1:
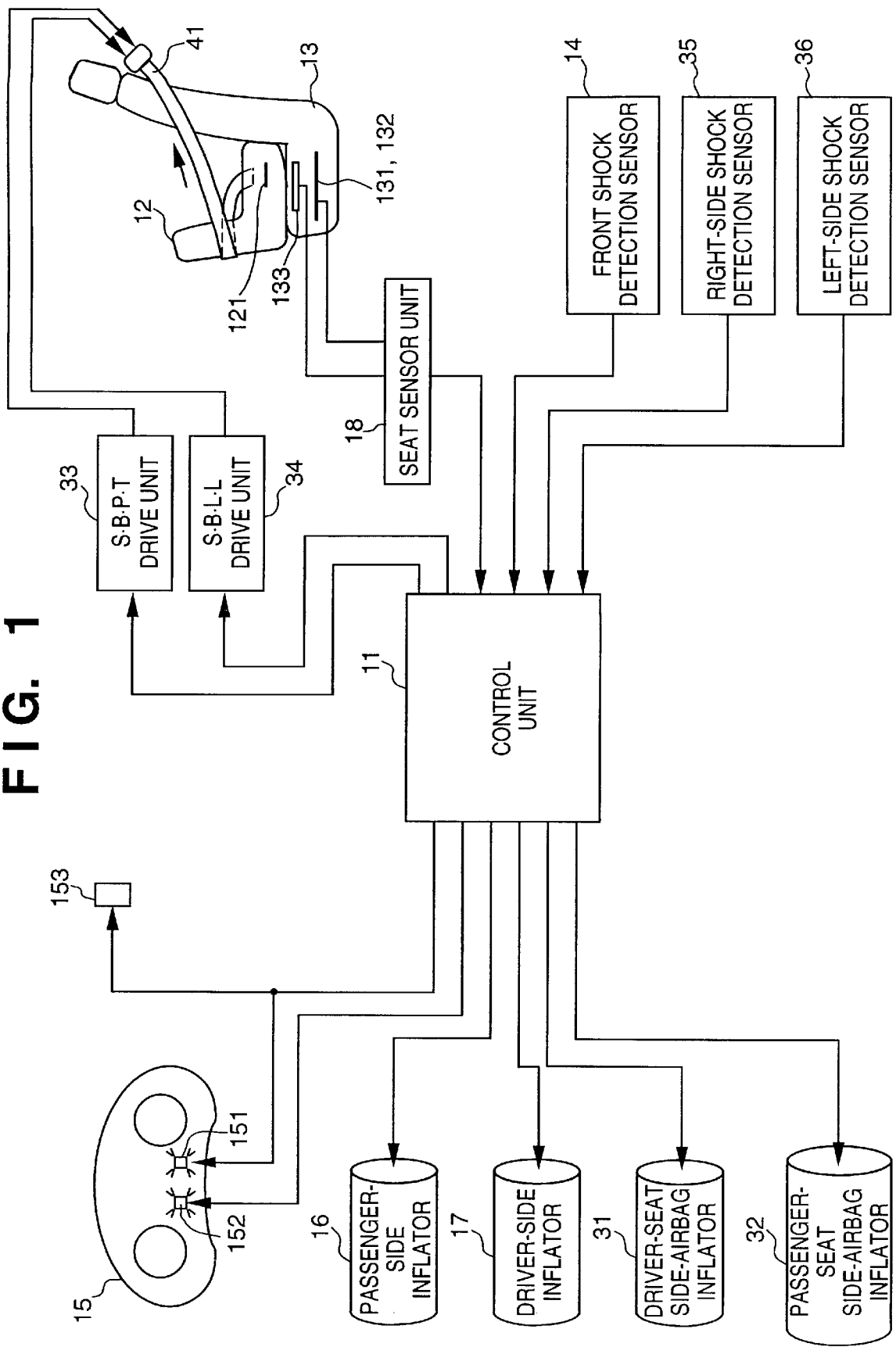
FIG. 1 is a schematic diagram showing the arrangement of an airbag system according to the first embodiment of the present invention.

The preferred embodiments in which an airbag system according to the present invention is applied to an automobile as a typical vehicle will be described hereinafter with reference to the accompanying drawings. Note that the same reference numerals of drawings and the same step numbers of flow charts as those in the first embodiment are used in the embodiments to be described later, and a detailed description thereof will be omitted.

First Embodiment

The outline of an airbag system of this embodiment will first be described with reference to FIGS. 1 and 2.

Figure 2:
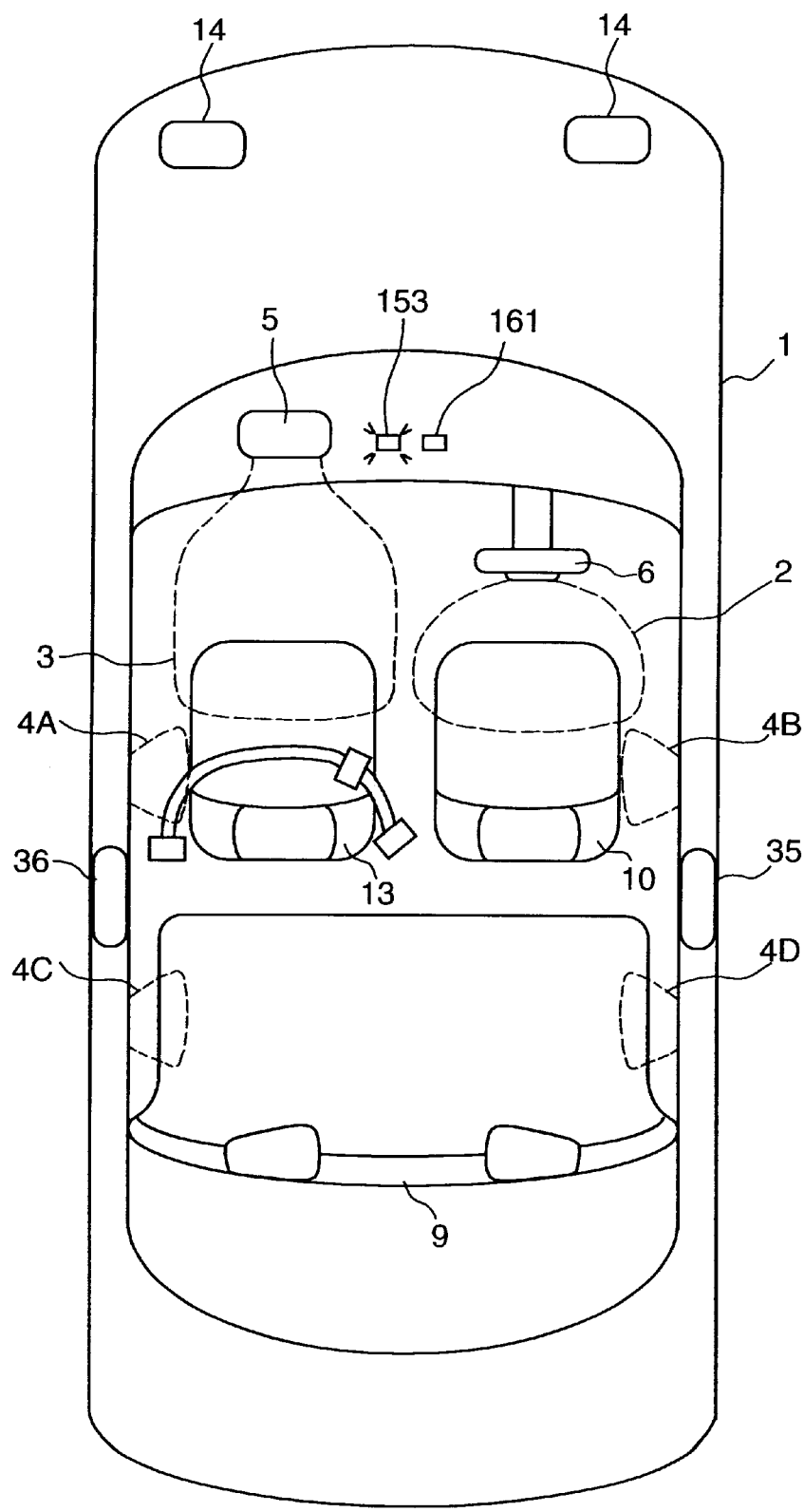
FIG. 2 is a schematic view of an automobile with the airbag system according to the first embodiment of the present invention.

FIG. 2 is a schematic view of an automobile with the airbag system according to the first embodiment of the present invention.

In FIG. 2, an automobile 1 is equipped with a driver-side airbag 2 (in the inflated state) for a passenger at a driver seat 10 inside a steering wheel 6, and a passenger-side airbag 3 (in the inflated state) for a passenger at a front passenger seat 13 inside a passenger-side airbag storage portion 5. Also, side airbags 4A to 4D (in the inflated state) for relaxing shocks from the side directions are respectively equipped beside the driver seat 10 and front passenger seat 13, and both sides of a back seat 9.

The body of the automobile 1 comprises a plurality of shock detection sensors for outputting trigger signals for inflating these airbags, as shown in FIG. 2. More specifically, the body of the automobile 1 is equipped with a front shock detection sensor 14 for detecting shocks from the front direction, a right-side shock detection sensor 35 for detecting shocks from the right-side direction, and a left-side shock detection sensor 36 for detecting shocks from the left-side direction.

Reference numeral 153 denotes a status indication lamp that indicates the current control state of the passenger-side airbag. For example, the lamp 153 is ON when the passenger-side airbag 3 is inhibited from inflating; it is OFF when it is permitted to inflate.

Note that reference numeral 161 denotes a status confirmation switch used in other embodiments to be described later, and this switch is operated when the passenger confirms whether inflation (inflation permission/inhibition) of the passenger-side airbag 3 is currently needed.

FIG. 1 is a schematic diagram showing the arrangement of the airbag system according to the first embodiment of the present invention.

In FIG. 1, a control unit 11 of the airbag system of this embodiment is connected with the above-mentioned front shock detection sensor 14, right-side shock detection sensor 35, and right-side shock detection sensor 36, a seat sensor unit 18 (to be described in detail later) for communicating the attached state of the child seat 12, a passenger-side inflator 16 for inflating the passenger-side airbag 3, a passenger-seat side-airbag inflator 32 for inflating the side airbag 4A for the front passenger seat, a driver-side inflator 17 for inflating the driver-side airbag 2, and a driver-seat side-airbag inflator 31 for inflating the side airbag 4B for the driver seat.

Also, the control unit 11 is connected with the status indication lamp 151 which indicates the current control state of the passenger-side airbag 3 and is arranged in an instrument panel 15 in front of the driver seat 10, a failure warning indication lamp 152 which indicates the failure state of the passenger-side airbag 3 and is arranged in the instrument panel 15 in front of the driver seat 10, and the above-mentioned status indication lamp 153.

Furthermore, the control unit 11 is connected with a drive unit 33 for a so-called seatbelt pretensioner (S.B.P.T) that restrains a passenger by pulling in a seatbelt 41 upon detecting shocks, and a drive unit 34 for a so-called seatbelt load limiter (S.B.L.L) for relaxing shocks to the passenger by loosening the seatbelt 41 upon car crash.

As will be described in detail later, FIG. 1 illustrates the state wherein the child seat 12 is attached to the front passenger seat 13. The seat sensor unit 18 is connected with a passenger detection sensor 133 which is embedded in the front passenger seat 13 and detects the presence/absence of a passenger by means of weight, and reception and transmission antennas 131 and 132 embedded in the front passenger seat 13. The seat sensor unit 18 makes radio communications with a transponder 121 equipped in the child seat 12, and converts a signal received by the reception antenna 131 on the basis of a predetermined format and transmits the converted signal to the control unit 11.

Operation of Seatbelt Pretensioner and Seatbelt Load Limiter

The operation of the seatbelt pretensioner and seatbelt load limiter will be explained below.

Seatbelt pretensioner: Upon receiving an activation signal from the control unit 11, the seatbelt pretensioner drive unit 33 is driven. The drive unit 33 operates a seatbelt pretensioner inflator (not shown) upon receiving the activation signal, and pulls in the seatbelt by a predetermined length before the airbag contacts the passenger. Alternatively, a seatbelt pretensioner spring (biased in a direction to pull in the seatbelt) and a stopper for regulating biasing of that spring are arranged in place of the seatbelt pretensioner inflator, and upon receiving an activation signal from the control unit 11, regulation of the seatbelt pretensioner spring by the stopper is released to pull in the seatbelt by a predetermined length before the airbag contacts the passenger.

In this embodiment, the operation permission/inhibition state of the seatbelt pretensioner drive unit 33 is determined by a signal from the control unit 11.

Figure 34:
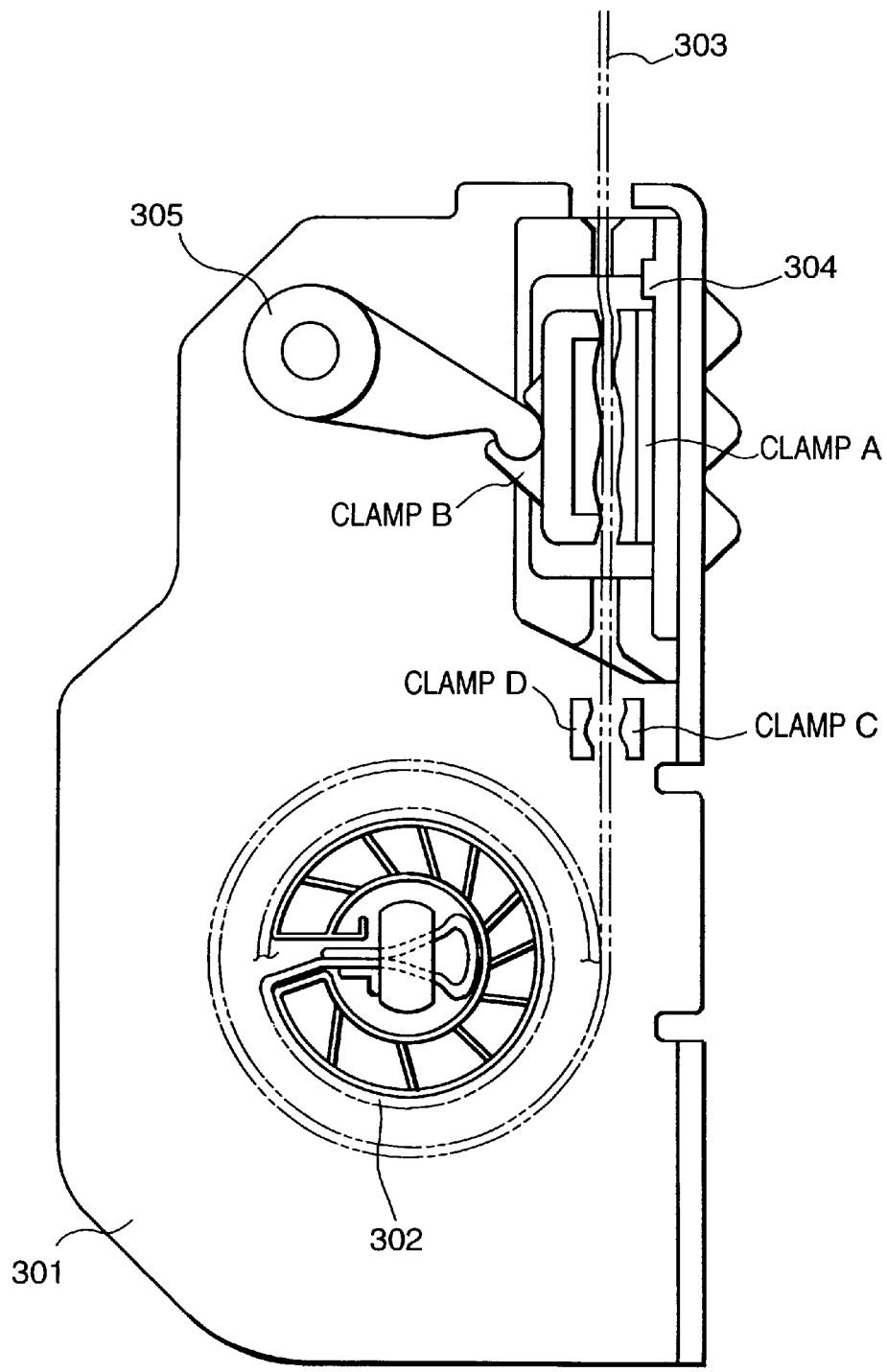
FIG. 34 is a view for explaining the operation of a seatbelt load limiter according to the first embodiment of the present invention.
Figure 35:
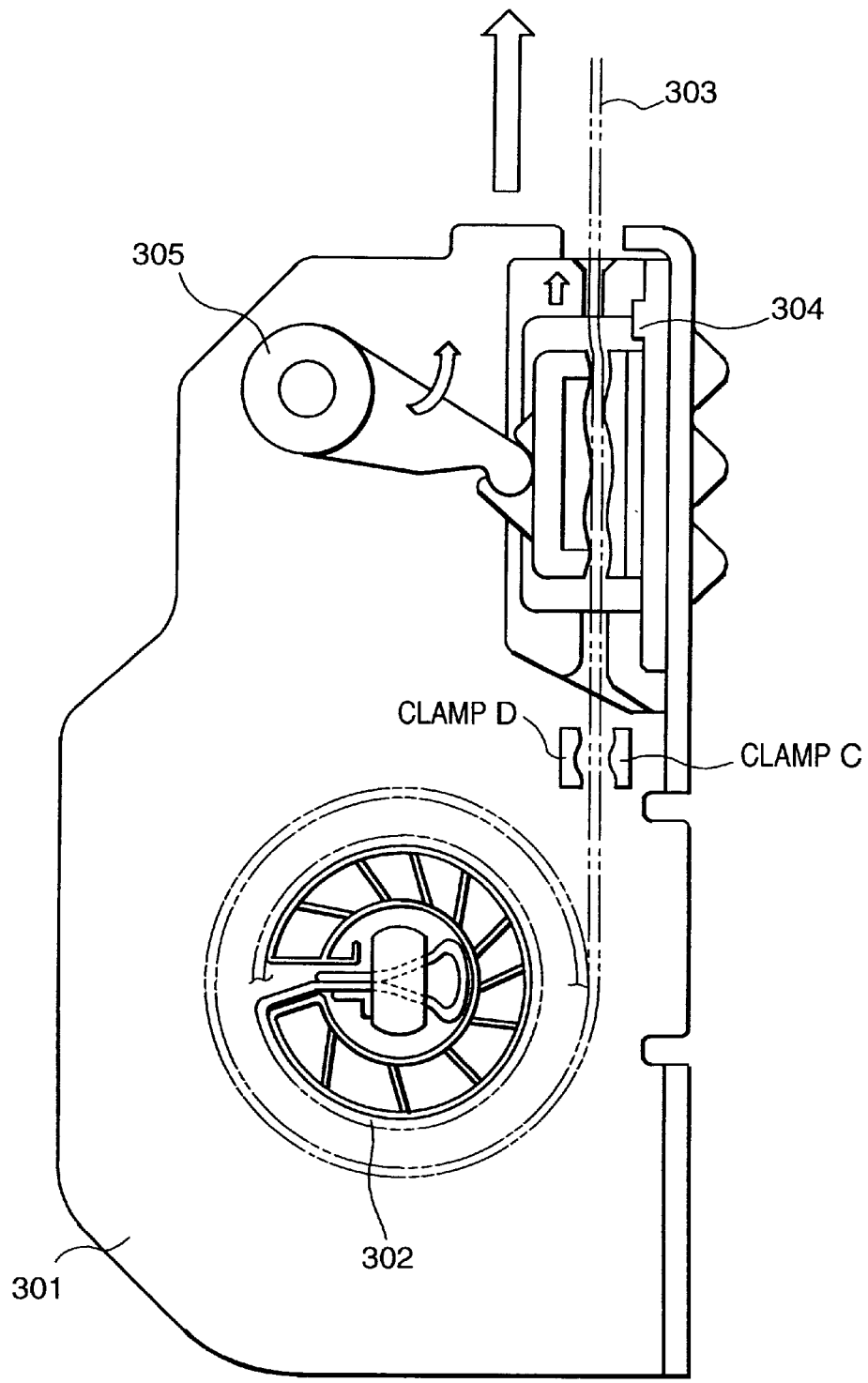
FIG. 35 is a view for explaining the operation of the seatbelt load limiter according to the first embodiment of the present invention.
Figure 36:
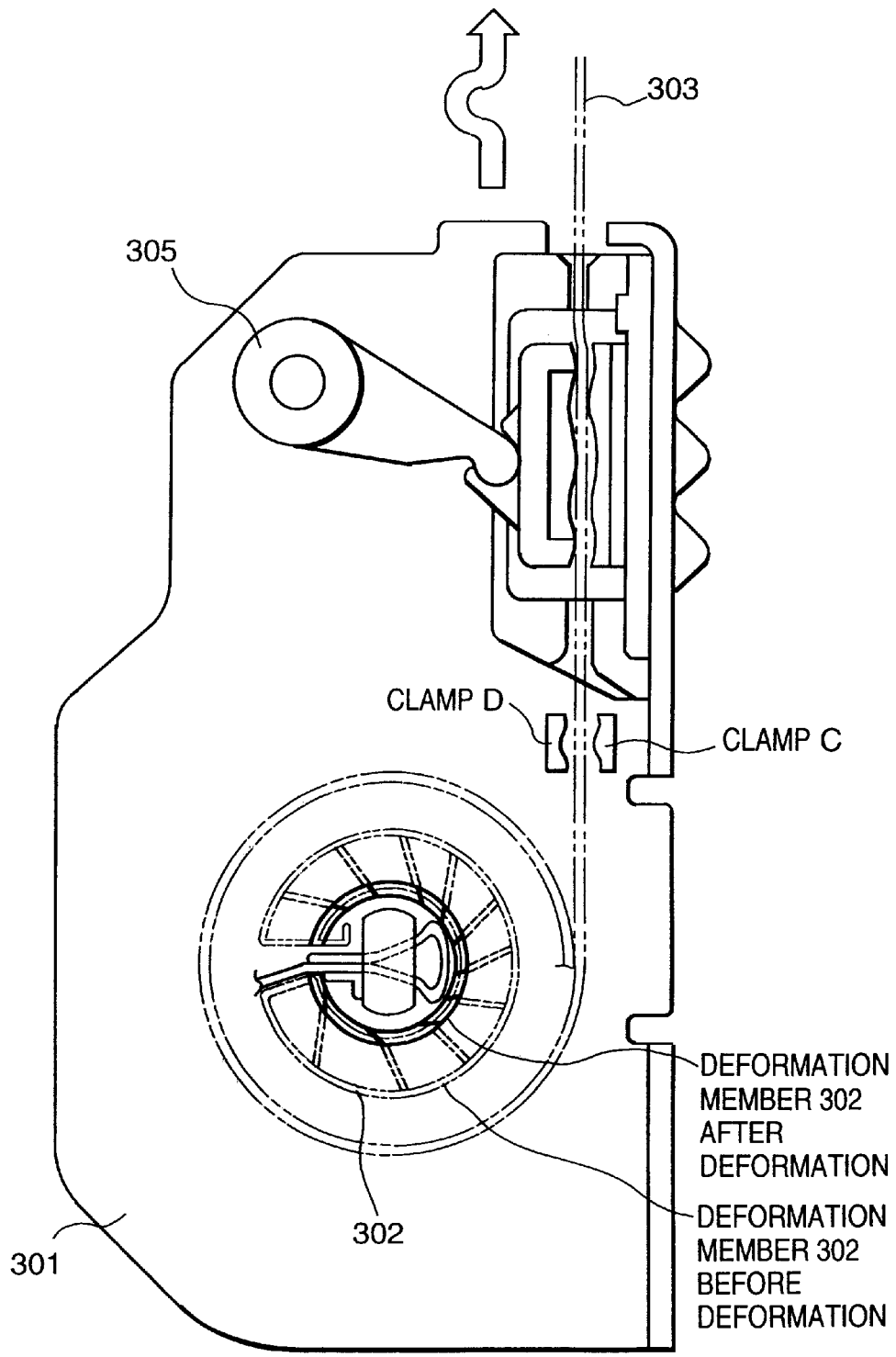
FIG. 36 is a view for explaining the operation of the seatbelt load limiter according to the first embodiment of the present invention.

Seatbelt load limiter: The seatbelt is pulled out by a predetermined length to prevent the load from being concentrated on the passenger by the seatbelt upon car crash. As a mechanism for pulling out the seatbelt by the predetermined length, for example, a mechanism for plastically deforming or frictionally sliding the seatbelt itself, the retractor of the seatbelt, or the attachment mechanism of the retractor to the vehicle body to reduce the load onto the passenger when the passenger applies a load of a predetermined value or more to the seatbelt is preferably used. FIGS. 34 to 36 show an example of the seatbelt load limiter.

FIGS. 34 to 36 are views for explaining the operation of the seatbelt load limiter according to an embodiment of the present invention.

In FIGS. 34 to 36, a seatbelt load limiter 301 is made up of a webbing 303 of the seatbelt, a deformation member 302 for taking up the webbing 303, clamps A to D for clamping the webbing 303, lock lever 305, and the like. The clamps C and D are controlled between a seatbelt load limiter operation permission state (they do not clamp the webbing 303) and inhibition state they clamp the webbing 303) by an activation signal from the control unit 11. FIG. 34 shows the seatbelt load limiter operation permission state, i.e., a normal state. FIG. 35 shows the state upon receiving an activation command from the control unit 11 in the operation permission state. In response to the activation command, the lock lever 305 pivots counterclockwise by a predetermined amount (at that time, the webbing 303 taken up on the deformation member 302 is inhibited from being pulled out). When the lock lever 305 has pivoted, the clamps A and B clamp the webbing 303. At this time, since the webbing 303 is pulled out upward by the load acting on the passenger, the clamps A and B move upward in FIG. 35 while clamping the webbing 303, and increase the force with which they clamp the webbing 303 as they move upward. FIG. 36 shows the state wherein the clamps A and B contact a stopper 304 after they move while clamping the webbing 303. In this state, the force with which the clamps A and B clamp the webbing 303 does not increase any more. Hence, the position of the stopper 304 is determined at a position where the force with which the clamps A and B clamp the webbing 303 is set as large as the webbing 303 is pulled out by the shock force onto the passenger upon car crash. When the shock force onto the passenger is produced upon car crash, the webbing 303 is pulled out. In this case, the pull-out amount corresponds to only a predetermined length obtained when the deformation member 302 deforms to reduce the take-up radius of the webbing 303.

Device Arrangements of Control Unit and Seat Sensor Unit

The device arrangements of the control unit 11 and seat sensor unit 18 will be described below with reference to FIGS. 3 and 4.

Figure 3:
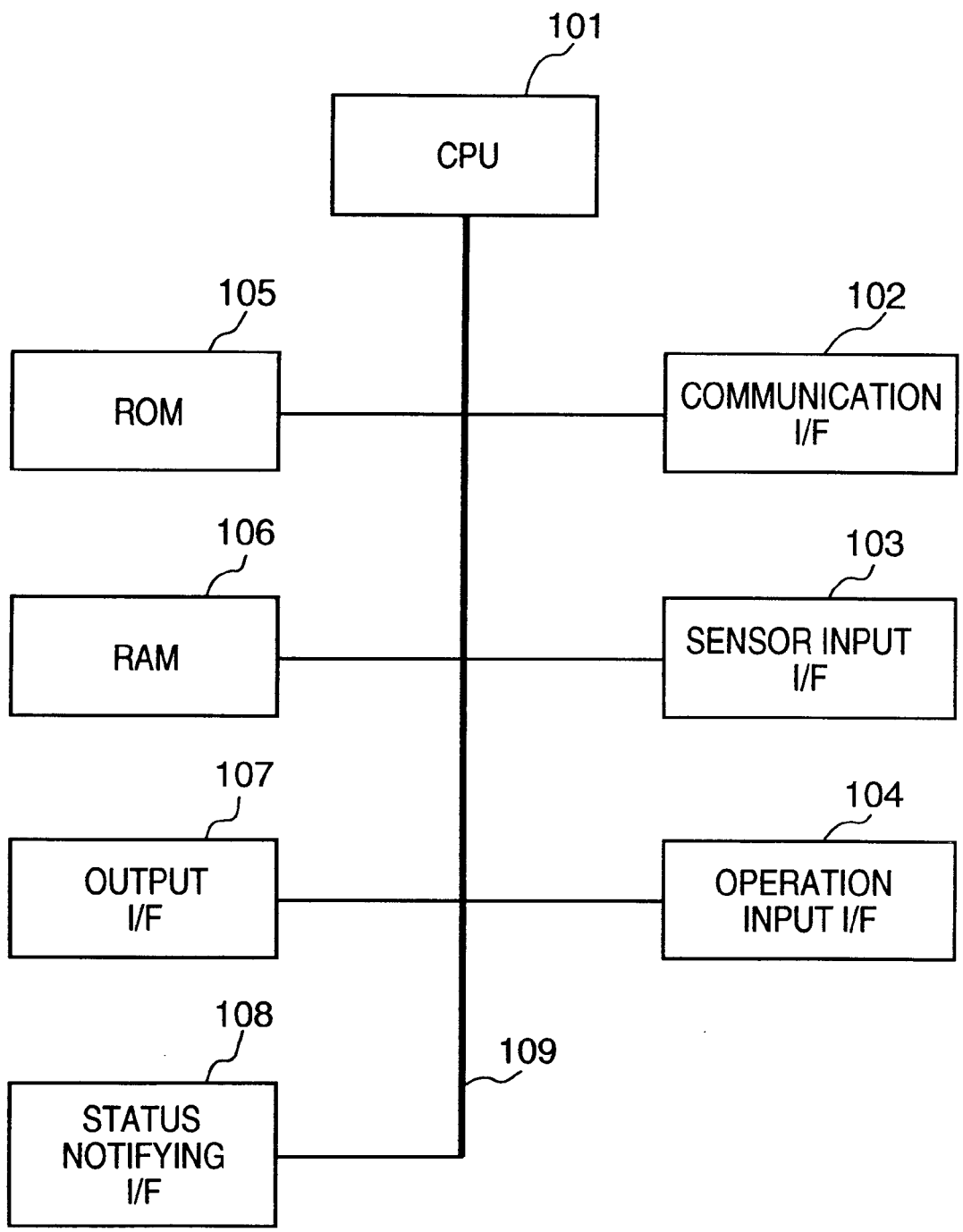
FIG. 3 is a schematic block diagram showing the arrangement of a control unit 11 according to the first embodiment of the present invention.

FIG. 3 is a schematic block diagram showing the arrangement of the control unit 11 according to the first embodiment of the present invention.

In FIG. 3, a communication interface (I/F) 102 is connected to the seat sensor unit 18 and makes predetermined serial communications (to be described in detail later). A sensor input interface (I/F) 103 receives the input signals from the shock detection sensors 14. An operation input interface (I/F) 104 receives status confirmation request signals from status confirmation switches 161 and 162 used in other embodiments to be described later. An output interface (I/F) 107 outputs inflating signals to the individual inflators such as the passenger-side inflator 16, and the like. A status notifying interface (I/F) 108 turns on/off the status indication lamps 151 and 153 and the failure warning indication lamp 152. A ROM (read only memory) 105 pre-stores a inflation control program of the passenger-side airbag and side airbags, a communication program with the seat sensor unit 18, various permanent parameters, and the like, as will be described later in this embodiment. A RAM (random access memory) 106 is used as a work area upon executing the control program, and temporarily stores variable parameters and the like. These arrangements are connected to each other via a bus 109, and are controlled by a CPU 101 which operates in accordance with the control program stored in the ROM 105.

Figure 4:
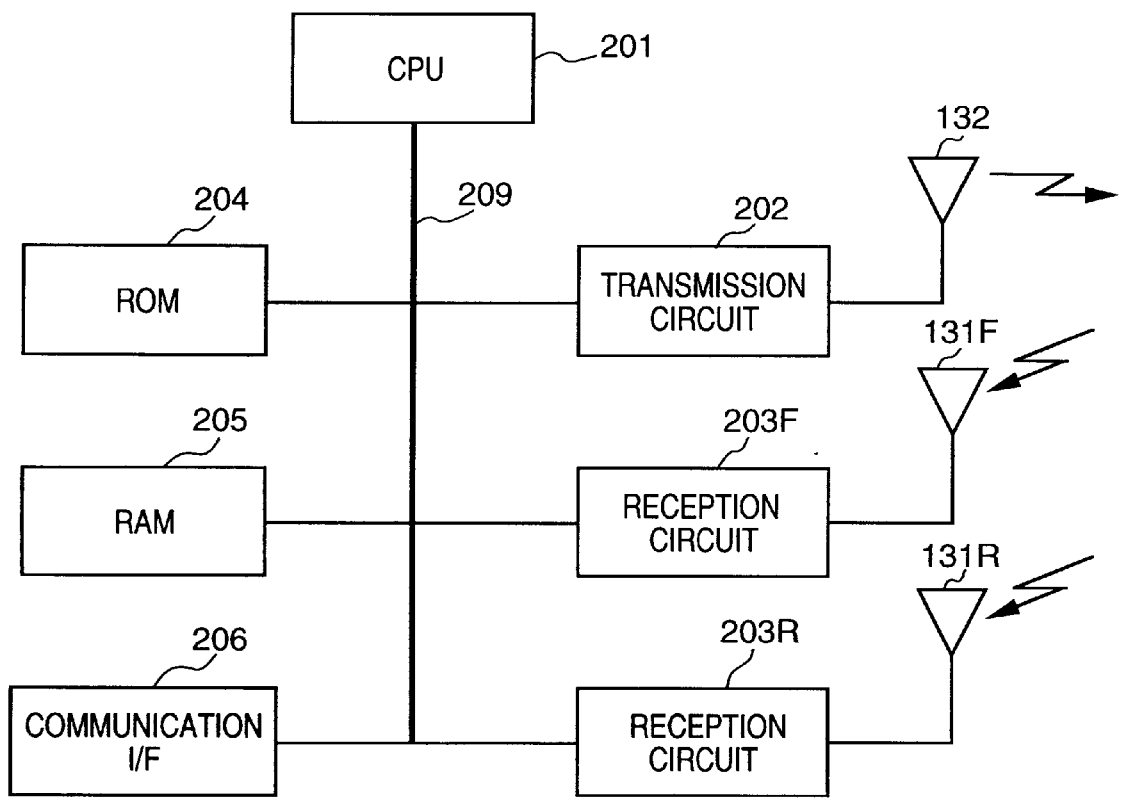
FIG. 4 is a schematic block diagram showing the arrangement of a seat sensor unit 18 according to the first embodiment of the present invention.

FIG. 4 is a schematic block diagram showing the arrangement of the seat sensor unit 18 according to the first embodiment of the present invention.

In FIG. 4, a transmission circuit 202 sends a predetermined frequency Fa from the transmission antenna 132. Reception circuits 203F and 203R receive external radio waves using reception antennas 131F and 131R. A communication interface (I/F) 206 is connected to the control unit 11 and makes predetermined serial communications (to be described in detail later). A ROM (read only memory) 204 pre-stores a communication program for converting signals received by the reception circuits 203F and 203R and the input signal from the passenger detection sensor 133 into those of a predetermined format, and transmitting the converted signals to the control unit 11, various permanent parameters, and the like. Assume that the ROM 204 also stores a program that can detect any hardware errors of the child seat 13 and/or the passenger detection sensor 133. A RAM (random access memory) 205 is used as a work area upon executing the communication program, and temporarily stores variable parameters, and the like. These arrangements are connected to each other via a bus 209, and are controlled by a CPU 201 which operates in accordance with the control program stored in the ROM 204.

Communication Arrangement Between Control Unit and Seat Sensor Unit

Serial communications between the control unit 11 and the seat sensor unit 18 will be described below with reference to FIGS. 5 and 6.

Figure 5:
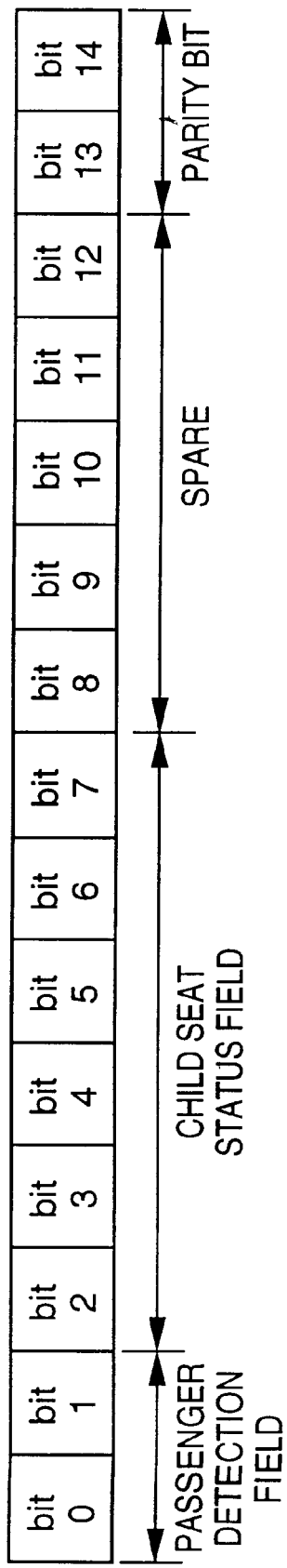
FIG. 5 shows the communication format according to the first embodiment of the present invention.

FIG. 5 shows the communication format according to the first embodiment of the present invention. In this embodiment, for example, the serial communications between the control unit 11 and seat sensor unit 18 are done using a protocol consisting of 13 data bits and 2 parity bits shown in FIG. 5. Assignment of these bits will be explained below. Bits 0 and 1 form a passenger detection field which represents the detection result of a passenger at the front passenger seat by the passenger detection sensor 133. Bits 2 to 7 form a child seat status field which represents the attached state of the child seat 12. Bits 8 to 12 are spare bits. Bit 13 is a party bit for odd bits, and bit 14 is a party bit for even bits. Using these parity bits, the communication interface 102 of the control unit 11 detects communication errors using a general method. In this embodiment, "0" and "1" of these bits are expressed using different bit lengths. Assume that serial data with such format is transmitted from the seat sensor unit 18 to the control unit 11 at a predetermined period. (In this embodiment, the seat sensor unit 18 can detect hardware abnormality determined by the self diagnosis function of the passenger detection sensor 133 and that determined by the self diagnosis function of the child seat 13, and outputs the detection result as communication data to the control unit.) FIG. 6 shows this example.

Figure 6:
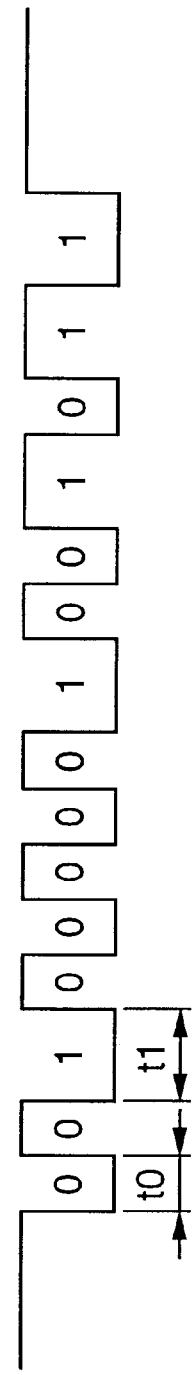
FIG. 6 is an explanatory view of an example of communication data according to the first embodiment of the present invention.

FIG. 6 is an explanatory view of an example of communication data according to the first embodiment of the present invention, and shows the state of transmitted data "001000001001011". Note that a description of the actual contents expressed by combinations of bits "0" or "1" will be omitted, and the data to be transmitted from the seat sensor unit 18 to the control unit 11 will be described later with reference to FIG. 10.

Communication Between Front Passenger Seat and Child Seat

Communications between the front passenger seat 13 and child seat 12 will be described below. In this embodiment, radio communications between the front passenger seat 13 and child seat 12 are used for detecting whether or not the child seat 12 is attached to the front passenger seat 13, and detecting the attached state of the child seat 12 if it is attached. The communications will be briefly described below. The transmission antenna 132 on the front passenger seat 13 side always transmits the predetermined frequency Fa. When the child seat 12 is attached to the front passenger seat 13, the transponder 121 equipped in the child seat 12 receives the frequency Fa from the transmission antenna 132, and transmits a predetermined frequency Fb different from that frequency Fa. Based on the reception state of this frequency Fb by the reception antenna 131F and/or the reception antenna 131R on the front passenger seat 13 side, the presence/absence of attachment of the child seat 12 and its direction are detected. In this embodiment, assume that the transponder 121 has a structure which is passively driven by the frequency Fa from the transmission antenna 132. Hence, assume that the frequency Fa has an output which is capable of driving the transponder 121. The reason why such arrangement is adopted is that when the child seat 12 uses a conventional battery-driven transmission/reception circuit, interruption of its transmission/reception arising from short battery capacity or rough handling may pose a serious safety problem. Hence, the transponder 121 more preferably adopts a sealed structure to prevent short-circuiting or the like caused by liquids. Note that the child seat may comprise, e.g., a transmission circuit and the front passenger seat may comprise a reception circuit if such problems can be solved.

The transponder 121 has a buzzer (and/or a lamp; not shown), and makes self diagnosis when it starts operation in response to a radio wave from the transmission antenna 132. If the transponder is normal, the buzzer produces a sound for a predetermined period of time (and/or the lamp is kept ON during operation of the transponder 121). With this arrangement, the user can check if the child seat has failed.

The arrangements of the front passenger seat 13 and child seat 12 will be described below with reference to FIGS. 7 and 8.

Figure 7:
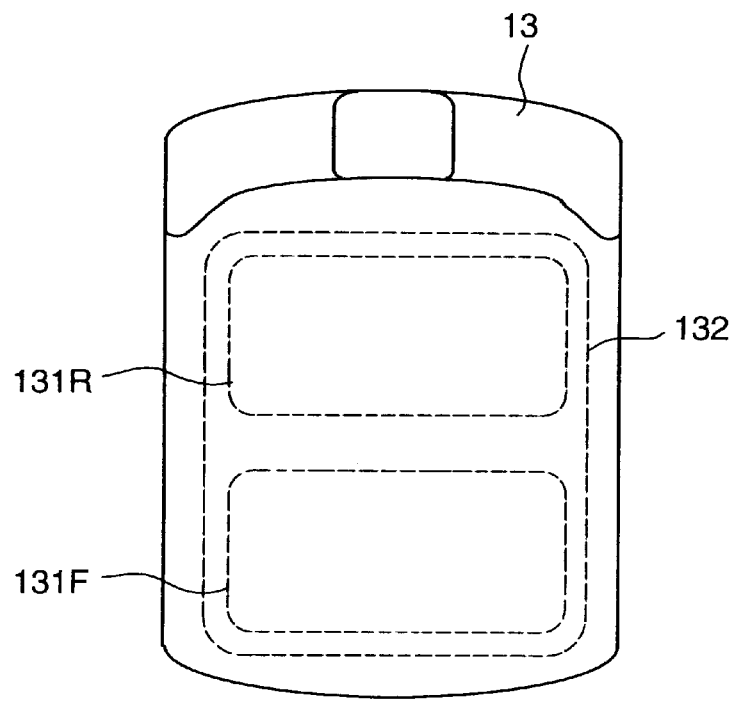
FIG. 7 is an explanatory view of an antenna equipped in a front passenger seat 13 according to the first embodiment of the present invention.

FIG. 7 is an explanatory view of the antennas equipped in the front passenger seat 13 according to the first embodiment of the present invention. FIG. 7 illustrates the front passenger seat 13 when viewed from the above. Inside the seat surface of the seat, the transmission antenna 132 for externally transmitting a signal of the frequency Fa output from the transmission circuit 202 of the seat sensor unit 18, and the reception antennas 131F and 131R for respectively inputting the externally received signals to the reception circuits 203F and 203R of the seat sensor unit 18 are arranged. In this embodiment, as shown in FIG. 7, the transmission antenna 132 has a rectangular shape having nearly the same size as that of the seat surface, and the reception antennas 131F and 131R have rectangular shapes respectively having nearly the same sizes as those of the front and rear halves of the seat surface. The reception circuits 203F and 203R of the seat sensor unit 18 receive the frequency Fb from the transponder 121. The CPU 201 compares the relative strengths of the signals received by these two reception circuits to determine one of the reception antenna ranges where the transponder 121 is located. Independently of the determined reception antenna range, if the signal strengths of the two reception circuits are lower than a predetermined value, it is determined that the child seat 12 is not normally attached (offset from a predetermined position).

Figure 8:
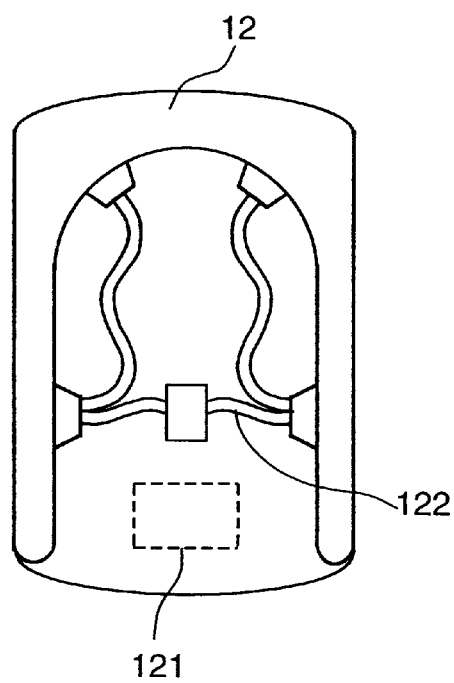
FIG. 8 is an explanatory view of a transponder equipped in a child seat 12 according to the first embodiment of the present invention.

FIG. 8 is an explanatory view of the transponder equipped in the child seat 12 according to the first embodiment of the present invention. FIG. 8 illustrates the child seat 12 when viewed from the above, and the transponder 121 is arranged on the front side of the interior or button portion of the seat surface. Note that the child seat 12 also has seatbelts 122.

Attached State of Child Seat

The attached state of the child seat 12 to the front passenger seat 13 will be explained below with reference to FIGS. 9A to 9D.

FIGS. 9A to 9D show various attached states of the child seat according to the first embodiment of the present invention. FIGS. 9A to 9D respectively depict the attached or placed states of the child seat 12 to or on the front passenger seat 13 as the positional relationship among the reception antennas 131F and 131R of the front passenger seat 13, and the transponder 121 of the child seat 12 (they are indicated by the solid lines) for the sake of simplicity. The arrow points in the front side of the front passenger seat 13. The states shown in FIGS. 9A to 9D will be described in turn below.

Figure 9A:
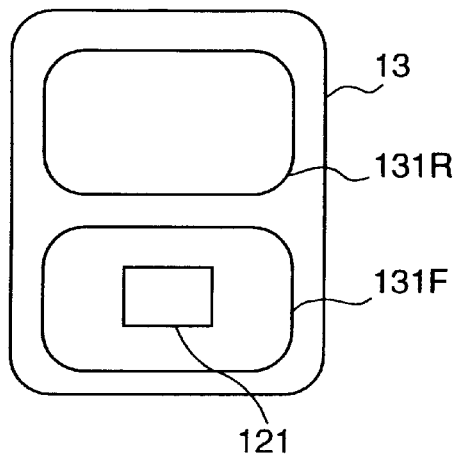
FIGS. 9A to 9D show variations of the attached state of the child seat according to the first embodiment of the present invention.

FIG. 9A shows the state wherein the child seat 12 is normally attached facing front, and the transponder 121 is located within the range of the reception antenna 131F. In this state, the seat sensor unit 18 receives the frequency Fb from the transponder 121 by the reception circuit 203F, and detects that the child seat 12 is normally attached facing front.

Figure 9B:
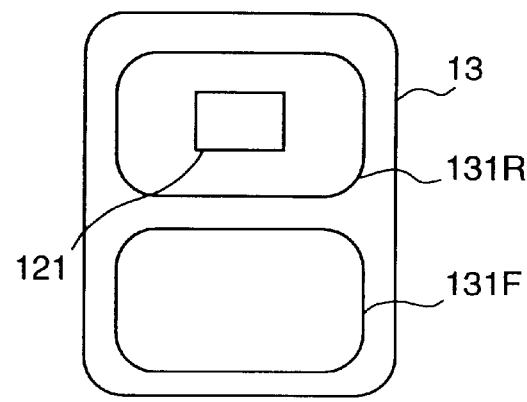

FIG. 9B shows the state wherein the child seat 12 is normally attached facing rear, and the transponder 121 is located within the range of the reception antenna 131R. In this state, the seat sensor unit 18 receives the frequency Fb from the transponder 121 by the reception circuit 203R, and detects that the child seat 12 is normally attached facing rear.

Figure 9C:
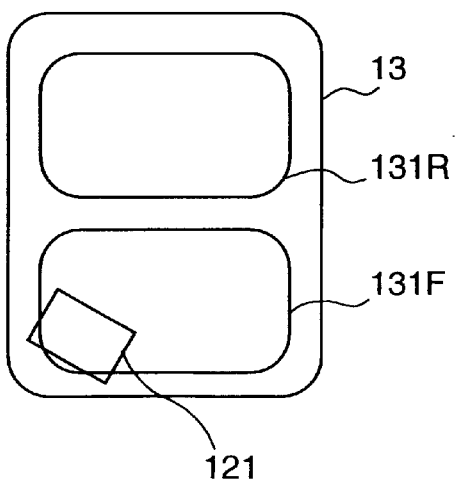

FIG. 9C shows the state wherein the child seat 12 is obliquely attached facing front, and the transponder 121 is located within the range of the reception antenna 131F. In this state, the seat sensor unit 18 determines abnormality since the reception circuit 203F cannot receive a predetermined signal strength due to offset of the child seat 12. Also, the seat sensor unit 18 makes a similar decision when the child seat 12 is offset facing rear.

Figure 9D:
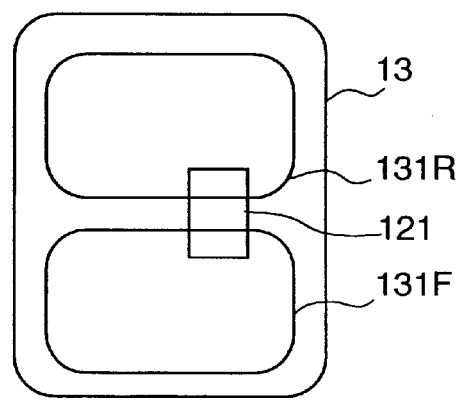

FIG. 9D shows the state wherein the child seat 12 is placed facing sideways, and the transponder 121 is located to extend over both the ranges of the reception antennas 131F and 131R. In such state, the seat sensor unit 18 compares the relative signal strengths obtained by the reception circuits 203F and 203R and determines that the child seat 12 is placed facing sideways.

Control of Airbags, Indication Lamps, and Seatbelts

The control of the airbags, indication lamps, and seatbelts in the airbag system of this embodiment will be described in detail below with reference to FIG. 10.

Figure 10:
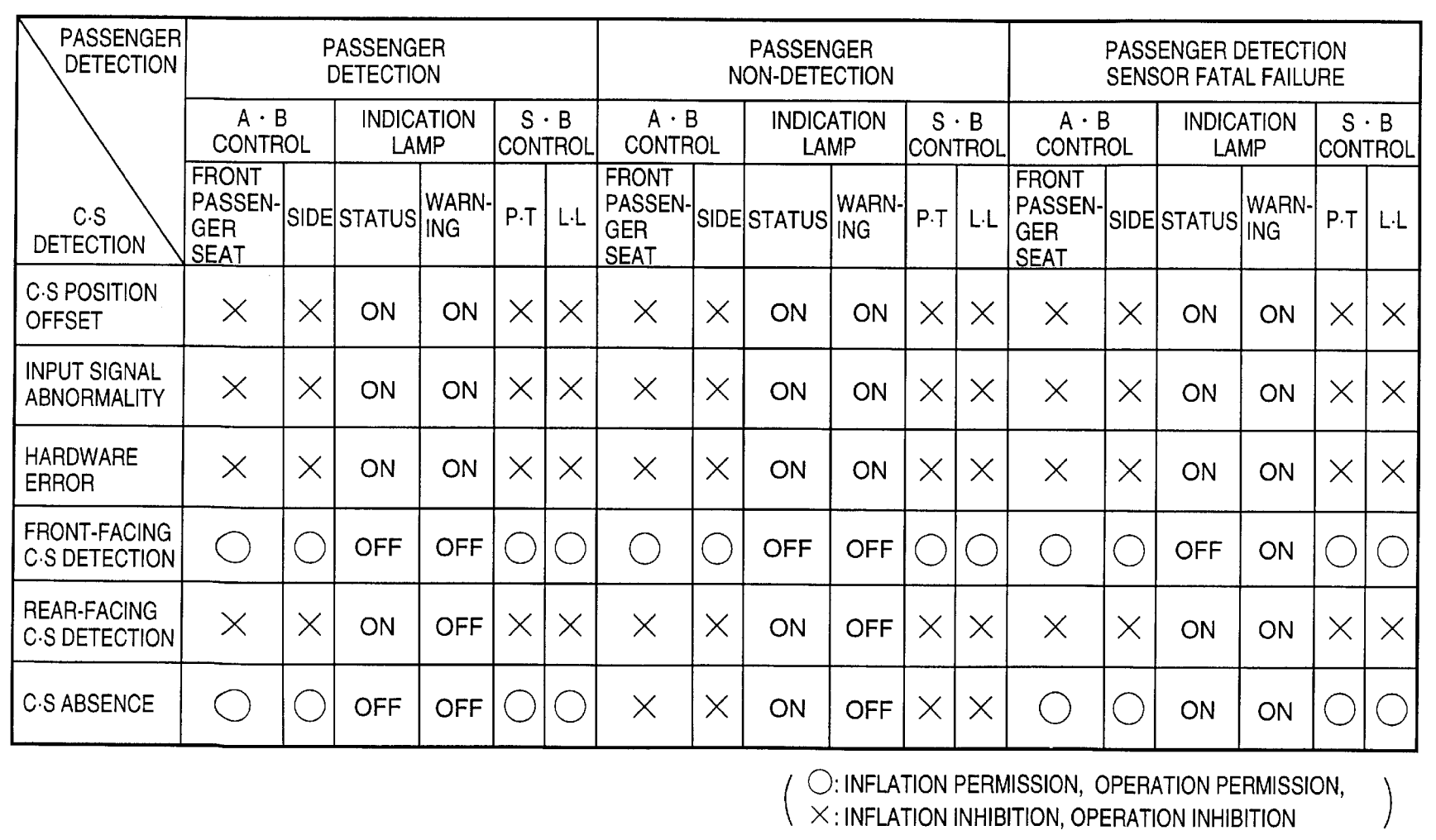

FIG. 10 is a table for explaining control according to the first embodiment of the present invention.

Cells in the column direction in FIG. 10 contain decision factors used by the control unit 11 to control the airbags, indication lamps, and seatbelts. The individual factors will be explained below.

"Child seat (C.S in FIG. 10) position offset" represents position offset of the child seat 12 detected by the seat sensor unit 18.

"Input signal abnormality" represents that a signal or signals input from the child seat 12 and/or passenger detection sensor 133 to the seat sensor unit 18 are not predetermined one.

"Hardware error" represents hardware abnormality of the child seat 12 and/or passenger detection sensor 133.

"Front-facing C.S detection" represents the case wherein the seat sensor unit 18 detects that the child seat 12 is attached facing front.

"Rear-facing C.S detection" represents the case wherein the seat sensor unit 18 detects that the child seat 12 is attached facing rear.

"C.S absence" represents the case wherein the seat sensor unit 18 cannot detect any child seat 12 and the case wherein the seat sensor unit 18 detects that hardware of the child seat 12 has fatally failed.

The above-mentioned decision factors correspond to the contents of the communication data shown in FIG. 5.

Cells in the row direction in FIG. 10 contain decision factors used by the control unit 11 to control the airbags, indication lamps, and seatbelts. The individual factors will be explained below.

"Passenger detection" represents the case wherein the passenger detection sensor 133 detects the presence of a passenger.

"Passenger non-detection" represents the case wherein the passenger detection sensor 133 does not detect any passenger.

"Passenger detection sensor error" represents that hardware of the passenger detection sensor 133 has fatally failed, i.e., the case wherein no signal can be obtained from the passenger detection sensor 133.

The above-mentioned decision factors correspond to the contents of the communication data shown in FIG. 5.

In the columns of "A.B control" in FIG. 10, "○" indicates permission of inflation of the passenger-side airbag 3 and side airbag 4A; "x" indicates inhibition of their inflation.

On the other hand, in the columns of "indication lamp" in FIG. 10, "status" represents ON/OFF state of the status indication lamps 151 and 153; "ON" indicates the ON state of the lamps (the inflation inhibition state of the passenger-side airbag 3 in this embodiment), and "OFF" indicates the OFF state of the lamps (the inflation permission state of the passenger-side airbag 3 in this embodiment). Also, in the columns of "indication lamp", "warning" represents the ON/OFF state of the failure warning indication lamp 152; "ON" indicates the ON state of the lamp (hardware abnormality of the passenger detection sensor 133 due to its fatal failure or determined by the self diagnosis function, hardware abnormality of the child seat 12 determined by the self diagnosis function in this embodiment), and "OFF" indicates the OFF state of the lamp (normal operations of the passenger detection sensor 133 and the seat sensor unit 18 in this embodiment).

Furthermore, in the columns of "S.B control" in FIG. 10, "○" indicates permission of operation of the seatbelt pretensioner and seatbelt load limiter; "x" indicates inhibition of their operation.

The behavior of the child seat 12 upon operation of the seatbelt pretensioner and seatbelt load limiter when the child seat 12 is attached to the front passenger seat 13 will be explained below with reference to FIGS. 16A and 16B and FIGS. 17A and 17B.

Figures 16A, 16B:
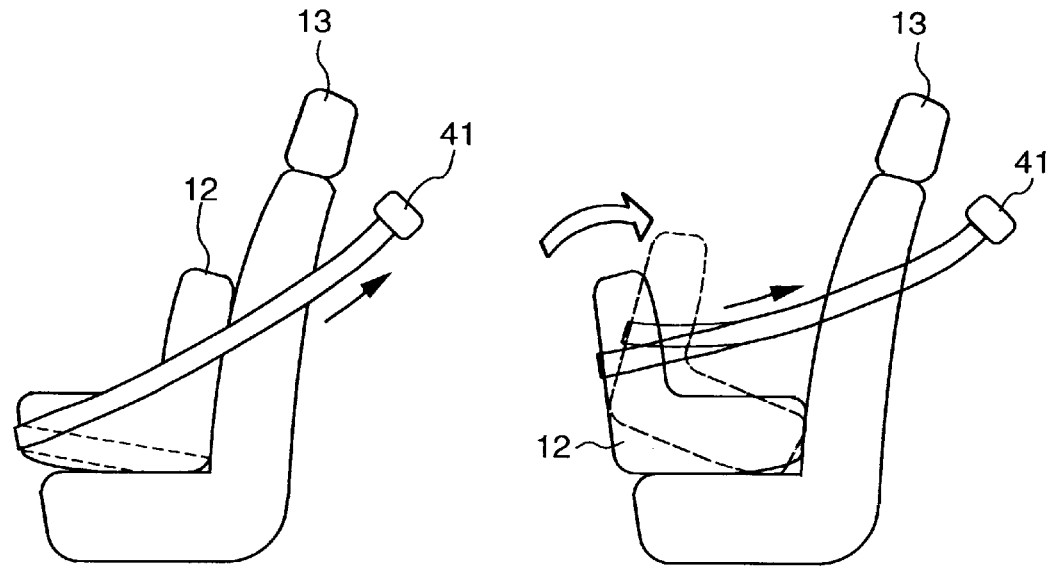
FIGS. 16A and 16B are views for explaining the behavior of a child seat upon operation of a seatbelt pretensioner according to the first embodiment of the present invention.

FIGS. 16A and 16B are views for explaining the behavior of the child seat upon operation of the seatbelt pretensioner according to the first embodiment of the present invention.

FIG. 16A shows the state wherein the child seat is attached facing front, and FIG. 16B shows the state wherein it is attached facing rear. A case will be examined below wherein the seatbelt pretensioner operates in these states and the seatbelt 41 is pulled in the direction of an arrow. In case of FIG. 16A, since the child seat 12 is restrained more securely in the direction of the seatback of the front passenger seat 13, no problem in terms of safety is posed (note that the child seat 12 itself also has the seatbelts 122). On the other hand, in case of FIG. 16B, since the position of the child seat 12 abruptly changes, i.e., the child seat rotates clockwise about the leading end portion of the seat surface of the child seat 12 upon operation of the seatbelt pretensioner, as shown in FIG. 16B, a serious problem in terms of safety is posed. In this embodiment, the seatbelt pretensioner is permitted to operate in case of FIG. 16A, and is inhibited from operating in case of FIG. 16B.

Figures 17A, 17B:
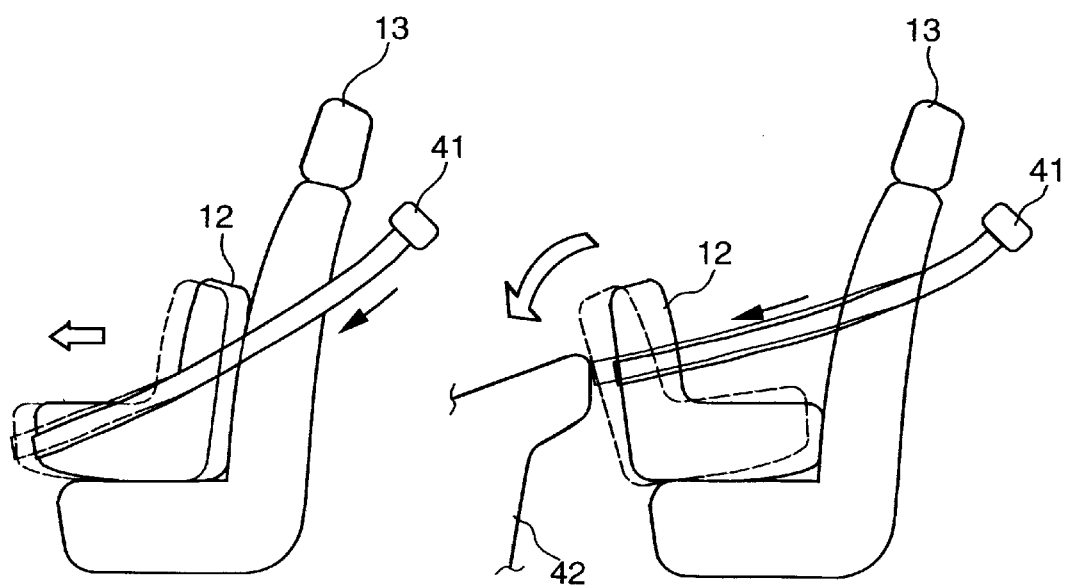
FIGS. 17A and 17B are views for explaining the behavior of a child seat upon operation of a seatbelt load limiter according to the first embodiment of the present invention.

FIGS. 17A and 17B are views for explaining the behavior of the child seat upon operation of the seatbelt load limiter according to the first embodiment of the present invention.

FIG. 17A shows the state wherein the child seat is attached facing front, and FIG. 17B shows the state wherein it is attached facing rear. A case will be examined below wherein the seatbelt load limiter operates in these states, and the restraint state by the seatbelt 41 is relaxed in the direction of an arrow. In case of FIG. 17A, shocks onto the child seat 12 upon car crash are relaxed (note that the child seat 12 itself also has the seatbelts 122). On the other hand, in case of FIG. 17B, since the position of the child seat 12 changes upon operation of the seatbelt load limiter, as shown in FIG. 17B, it is expected to collide against a dashboard 42. In this embodiment, the seatbelt load limiter is permitted to operate in case of FIG. 17A, and is inhibited from operating in case of FIG. 17B. In the case shown in FIG. 17B, if the child seat 12 is unlikely to collide against the dashboard 42 in consideration of the positional relationship with the dashboard 42, the seatbelt load limiter may be permitted to operate.

The contents of the individual columns in FIG. 10 will be explained below.

(Airbag control in case of "C.S position offset"):

The passenger-side airbag 3 and side airbag 4A are inhibited from inflating irrespective of the detection state of the passenger detection sensor 133. In this case, although the child seat position is offset, it is actually detected that the child seat 12 is attached facing front or rear. The reason why the passenger-side airbag 3 is inhibited from inflating in case of position offset is that top priority is given to inhibition of inflation of the passenger-side airbag 3 to guarantee the safety for the rear-facing child seat 12, since the child seat 12 itself has the seatbelts 122.

Also, the reason why the side airbag 4A for the front passenger seat is inhibited from inflating is that an effect of relaxing shocks cannot often be obtained in case of the rear-facing child seat 12 in practice even when the side airbag 4A inflates, and the child seat 12 itself has the seatbelts 122 and has a side surface shape that covers an infant, as shown in FIG. 8. Hence, although the repair frequency is likely to increase somewhat due to unnecessary inflation, the side airbag 4A for the front passenger seat may be permitted to inflate.

(Airbag control in case of "input signal abnormality" and "hardware error"):

The passenger-side airbag 3 and side airbag 4A are inhibited from inflating irrespective of the detection state of the passenger detection sensor 133 for the same reasons as in "C.S position offset".

(Airbag control in case of "front-facing C.S detection"):

The passenger-side airbag 3 and side airbag 4A are permitted to inflate irrespective of the detection state of the passenger detection sensor 133. This is because it is detected that the child seat 12 is normally attached facing front.

(Airbag control in case of "rear-facing C.S detection"):

The passenger-side airbag 3 and side airbag 4A are inhibited from inflating irrespective of the detection state of the passenger detection sensor 133. This is because it is detected that the child seat 12 is normally attached facing rear.

(Airbag control in case of "C.S absence"):

The passenger-side airbag 3 and side airbag 4A are permitted to inflate except for passenger non-detection. This is because when a passenger is detected, the airbag must be permitted to inflate, as a matter of course, and even when the passenger detection sensor 133 has fatally failed, a passenger may be sitting in the front passenger seat.

Note that the control unit 11 may also detect "C.S absence" in case of fatal failure of the passenger detection sensor 133 when the transponder 121 of the child seat 12 has failed, i.e., the child seat 12 is actually present on the front passenger seat 13. The operator can confirm such case since the warning indication lamp 152 is ON and he or she cannot obtain signaling of a buzzer of the transponder 121 upon attaching the child seat.

(Seatbelt control in case of "C.S position offset"):

The seatbelt pretensioner and seatbelt load limiter are inhibited from operating irrespective of the detection state of the passenger detection sensor 133. This is to prevent the states shown in FIGS. 16B and 17B that may pose serious problems in case of the rear-facing child seat 12, since it is actually detected that the child seat 12 is attached facing front or rear, although the child seat position is offset.

(Seatbelt control in case of "input signal abnormality" and "hardware error"):

The seatbelt pretensioner and seatbelt load limiter are inhibited from operating irrespective of the detection state of the passenger detection sensor 133 for the same reasons as in "C.S position offset".

(Seatbelt control in case of "front-facing C.S detection"):

The seatbelt pretensioner and seatbelt load limiter are permitted to operate irrespective of the detection state of the passenger detection sensor 133. This is because it is detected that the child seat 12 is normally attached facing front.

(Seatbelt control in case of "rear-facing C.S detection"):

The seatbelt pretensioner and seatbelt load limiter are inhibited from operating irrespective of the detection state of the passenger detection sensor 133. This is to prevent the states shown in FIGS. 16B and 17B described earlier since it is detected that the child seat 12 is normally attached facing rear.

(Seat control in case of "C.S absence"):

The seatbelt pretensioner and seatbelt load limiter are permitted to operate except for passenger non-detection. This is because when a passenger is detected, the seatbelt pretensioner and seatbelt load limiter must be permitted to operate, as a matter of course, and even when the passenger detection sensor 133 has fatally failed, a passenger may be sitting in the front passenger seat.

(ON/OFF control of status indication lamps 151 and 152):

In this embodiment, the status indication lamps 151 and 152 are OFF only in case of "front-facing C.S detection" or upon detecting a passenger in case of "C.S absence", and are ON in other cases. More specifically, the status indication lamps 151 and 153 are ON only when the passenger-side airbag 3 and side airbag 4A are inhibited from inflating.

(ON/OFF control of warning indication lamp 152):

In this embodiment, the lamp 152 is ON when one of "C.S position offset", "input signal abnormality", "hardware error", and fatal failure of the passenger detection sensor has occurred.

Description of Flow Charts

The detailed operations shown in FIG. 10, i.e., the airbag control, the ON/OFF control of the indication lamps, and the seatbelt control will be described below with reference to FIG. 18, FIGS. 21 and 25, and FIG. 26, respectively. These processing operations are time-divisionally executed by the CPU 101 of the control unit 11.

FIG. 18 is a flow chart showing the airbag control according to the first embodiment of the present invention. This control is executed by the control unit 11 on the basis of the above-mentioned communication data received from the seat sensor unit 18.

In FIG. 18, when the processing is started by turning on the ignition key, the control unit 11 reads the states of the individual sensors (step S11). The control unit 11 checks if one of "C.S position offset", "input signal abnormality", and "hardware error" has occurred (steps S12 to S14). If one of such states is detected, the flow advances to step S19. If none of these states are detected, the control unit 11 checks if the passenger detection sensor 133 has failed (step S15). If YES in step S15, the flow advances to step S20; otherwise, the flow advances to step S16.

The control unit 11 checks in step S20 if the sensor output indicates "front-facing C.S detection". If YES in step S20, the control unit 11 permits the passenger-side airbag 3 and side airbag 4A to inflate in step S21. On the other hand, if NO in step S20, the flow advances to step S18.

If a passenger is detected by the passenger detection sensor 133 in step S16 or if the sensor output indicates "front-facing C.S detection" in step S17, the control unit 11 permits the passenger-side airbag 3 and side airbag 4A to inflate in step S21, and the flow then returns. On the other hand, if NO in step S17, the control unit 11 checks if the sensor output indicates "rear-facing C.S detection" (step S18). If YES in step S18, the control unit 11 inhibits the passenger-side airbag 3 and side airbag 44 from inflating (step S19), and the flow returns. On the other hand, if NO in step S18, since this state corresponds to "C.S absence", the control unit 11 permits the passenger-side airbag 3 and side airbag 4A to inflate (step S21), and the flow then returns.

Figure 21:
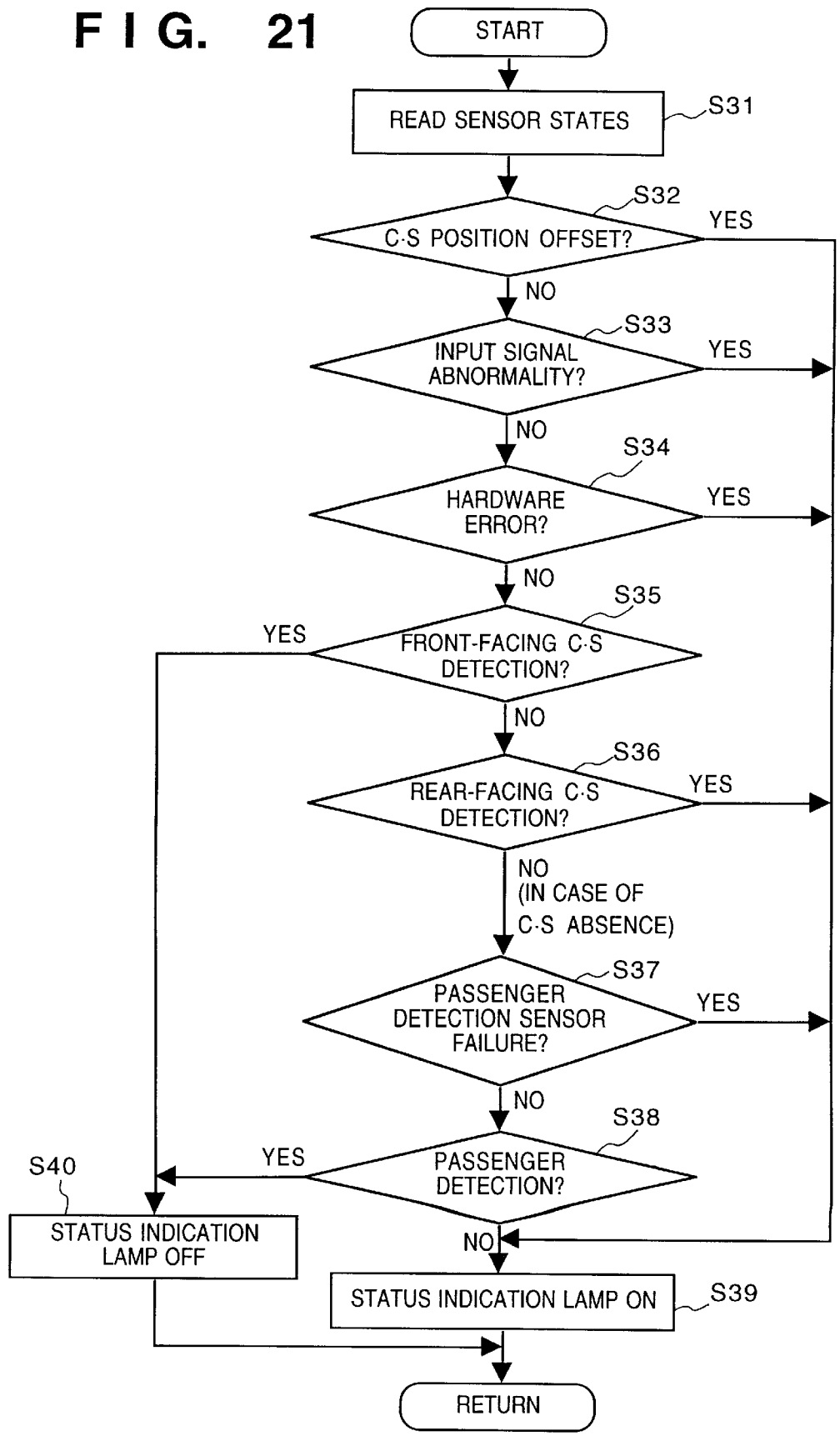
FIG. 21 is a flow chart showing status indication lamp control according to the first embodiment of the present invention.

FIG. 21 is a flow chart showing the status indication lamp control according to the first embodiment of the present invention. This control is executed by the control unit 11 on the basis of the above-mentioned communication data received from the seat sensor unit 18.

In FIG. 21, when the processing is started by turning on the ignition key, the control unit 11 reads the states of the individual sensors (step S31). The control unit 11 checks if one of "C.S position offset", "input signal abnormality", and "hardware error" has occurred (steps S32 to S34). If one of such states is detected, the control unit 11 turns on the status indication lamps 151 and 153 (step S39), and the flow then returns.

On the other hand, if none of "C.S position offset", "input signal abnormality", and "hardware error" are detected, the control unit 11 checks if the sensor output indicates "front-facing C.S detection" (step S35). If YES in step S35, the control unit 11 turns off the status indication lamps 151 and 153 (step S40), and the flow returns. On the other hand, if NO in step S35, the control unit 11 checks if the sensor output indicates "rear-facing C.S detection" (step S36). If YES in step S36, the flow advances to step S39. On the other hand, if NO in step S36, the control unit 11 checks if the passenger detection sensor 133 has failed (step S37). If YES in step S37, the flow advances to step S39. If NO in step S37, the control unit 11 checks if the passenger detection sensor 133 has detected a passenger (step S38). If YES in step S38, the flow advances to step S40 described above; otherwise, the flow advances to step S39.

Figure 25:
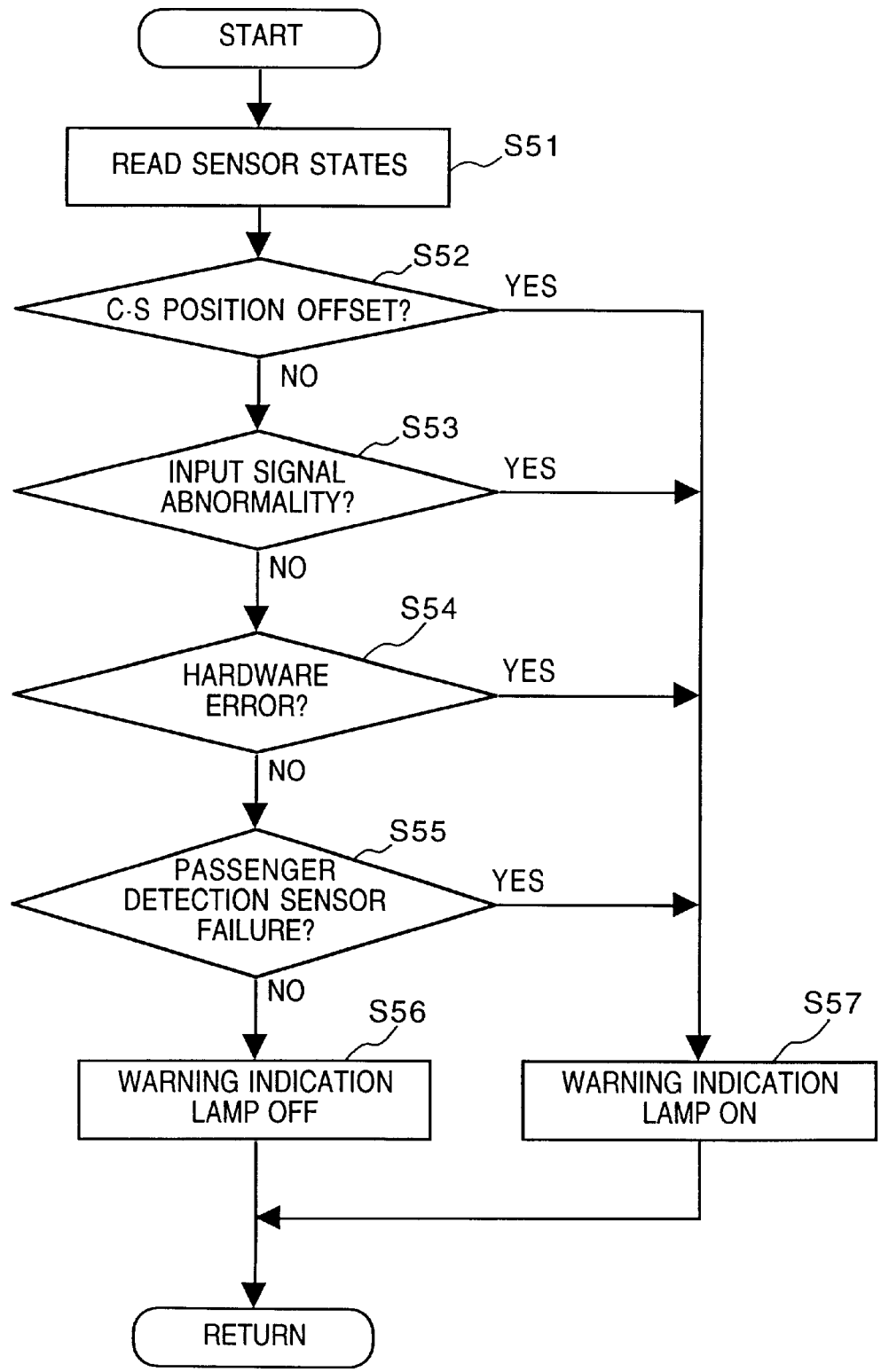
FIG. 25 is a flow chart showing warning indication lamp control according to the first embodiment of the present invention.

FIG. 25 is a flow chart showing the warning indication lamp control according to the first embodiment of the present invention. This control is executed by the control unit 11 on the basis of the above-mentioned communication data received from the seat sensor unit 18.

In FIG. 25, when the processing is started by turning on the ignition key, the control unit 11 reads the states of the individual sensors (step S51). The control unit 11 checks if one of "C.S position offset", "input signal abnormality", "hardware error", and failure of the passenger detection sensor 133 has occurred (steps S52 to S55). If one of such states is detected, the control unit 11 turns on the failure warning indication lamp 152 (step S56), and the flow returns.

On the other hand, if none of "C.S position offset", "input signal abnormality", "hardware error", and failure of the passenger detection sensor 133 are detected, the control unit 11 turns off the failure warning indication lamp 152 (step S57), and the flow returns.

Figure 26:
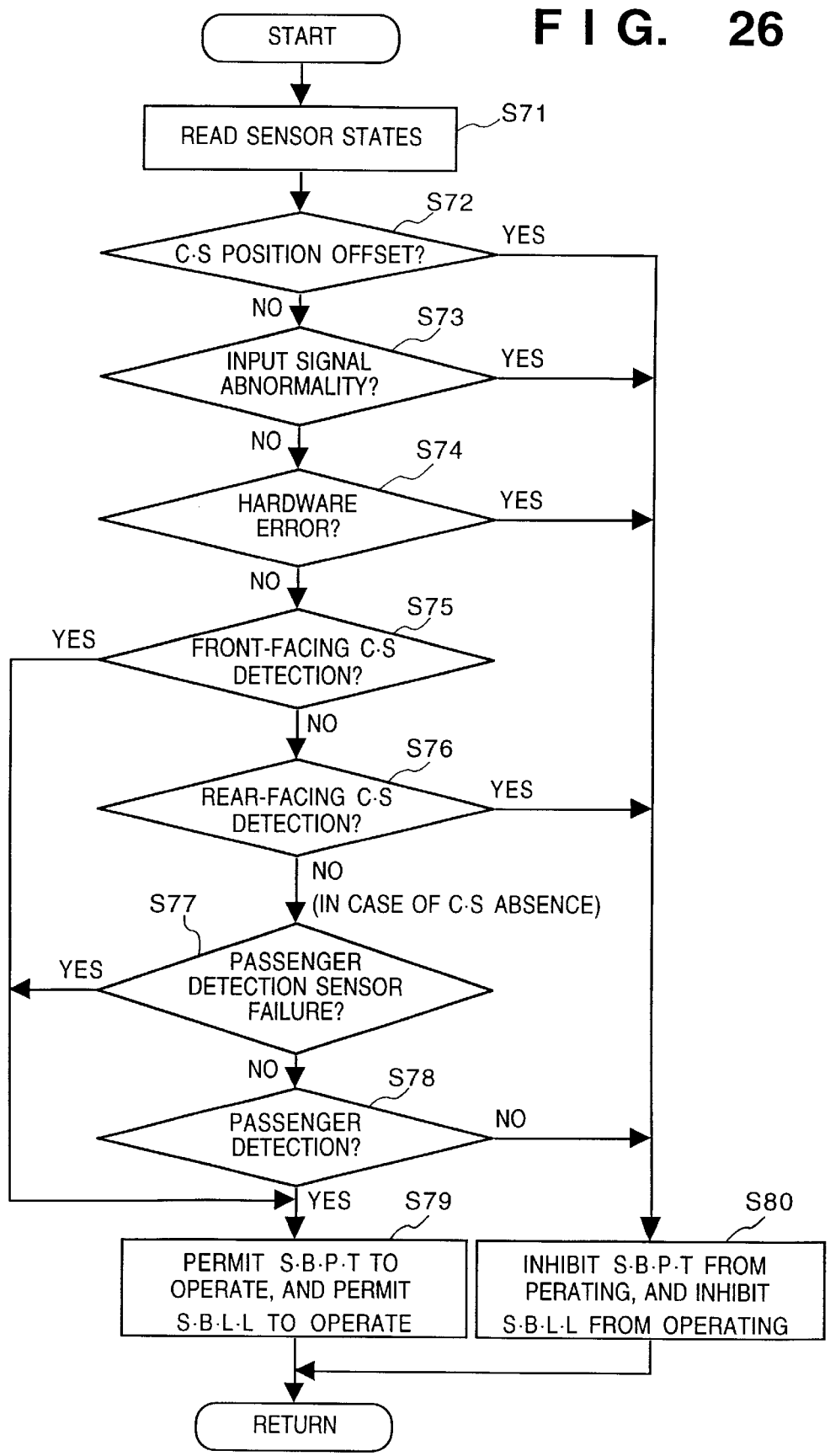
FIG. 26 is a flow chart showing seatbelt control according to the first embodiment of the present invention.

FIG. 26 is a flow chart showing the seatbelt control according to the first embodiment of the present invention. This control is executed by the control unit 11 on the basis of the above-mentioned communication data received from the seat sensor unit 18.

In FIG. 26, when the processing is started by turning on the ignition key, the control unit 11 reads the states of the individual sensors (step S71). The control unit 11 checks if one of "C.S position offset", "input signal abnormality", and "hardware error" has occurred (steps S72 to S74). If one of such states is detected, the control unit 11 inhibits the seatbelt pretensioner and seatbelt load limiter from operating (step S80), and the flow returns.

On the other hand, if none of "C.S position offset", "input signal abnormality", and "hardware error" are detected, the control unit 11 checks if the sensor output indicates "front-facing C.S detection" (step S75). If YES in step S75, the control unit 11 permits the seatbelt pretensioner and seatbelt load limiter to operate (step S79), and the flow then returns. On the other hand, if NO in step S75, the control unit 11 checks if the sensor output indicates "rear-facing C.S detection" (step S76). If YES in step S76, the flow advances to step S80 described above. If NO in step S76, the control unit 11 checks if the passenger detection sensor 133 has failed (step S77). If YES in step S77, the flow advances to step S79 described above. On the other hand, if NO in step S77, the control unit 11 checks if the passenger detection sensor 133 detects a passenger (step S78). If YES in step S78, the flow advances to step S79 described above; otherwise, the flow advances to step S80 described above.

Note that this embodiment has exemplified a system comprising both the seatbelt pretensioner and seatbelt load limiter, but the present invention may be applied to a system comprising either one of the seatbelt pretensioner and seatbelt load limiter.

In this embodiment, the operation state of the airbag system is signaled by means of the lamps. However, the present invention is not limited to such specific means, and an audio output may also be used.

Second Embodiment

Next, the second embodiment of the present invention will be described.

FIG. 11 is a table for explaining control according to the second embodiment of the present invention. In this embodiment, unlike the first embodiment, when the child seat 12 is attached facing front to the front passenger seat 13, the airbag 4A is inhibited from being inflating irrespective of the detection state of the passenger detection sensor 133. In such case, since inflation of the side airbag 4A is not effective for absorbing shocks, the child seat 12 is protected from sideward shocks by its side surface shape, i.e., the structure that covers an infant shown in FIG. 8, and an increase in repair frequency due to unnecessary inflation is reduced.

Figure 19:
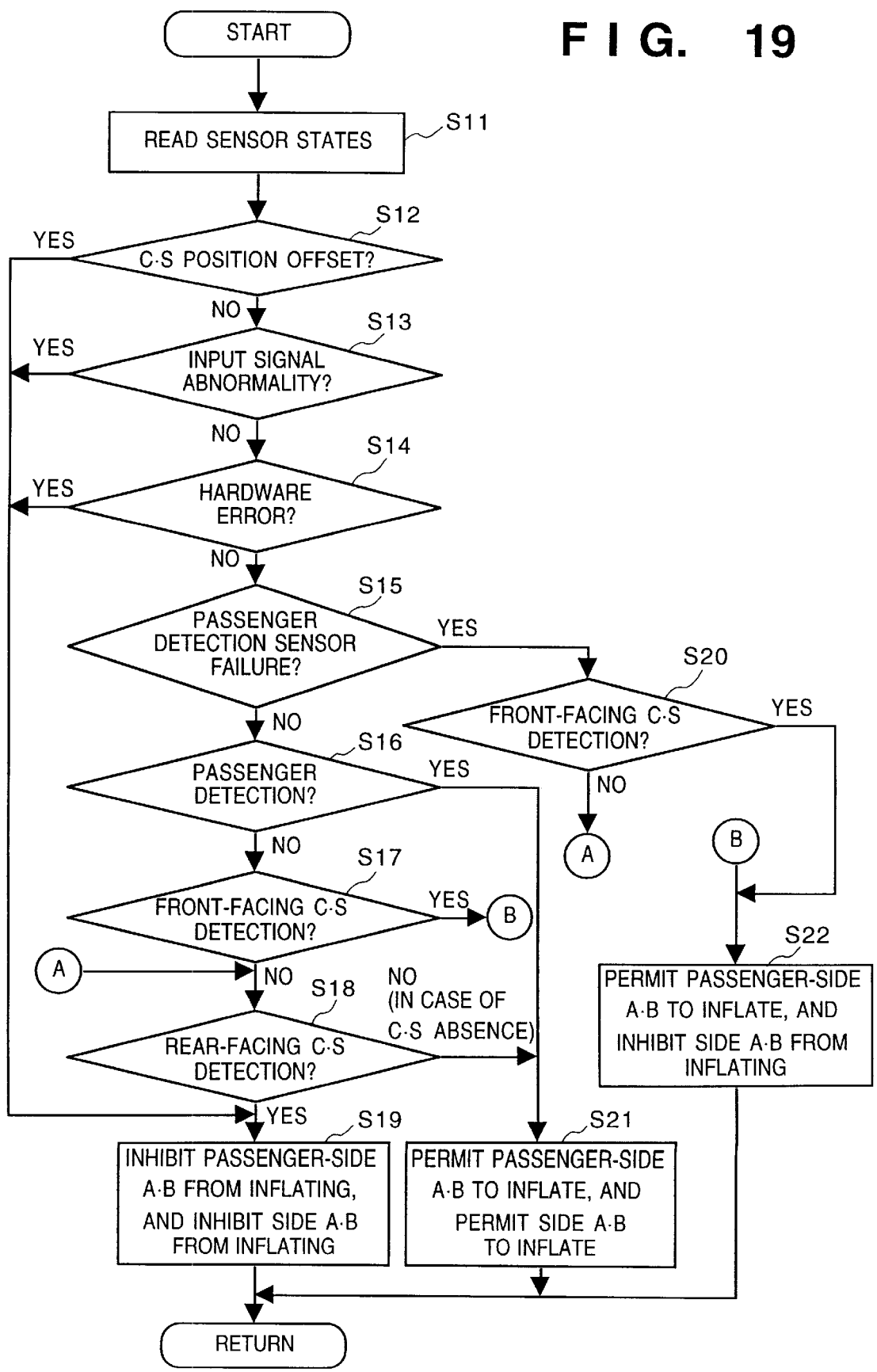
FIG. 19 is a flow chart showing airbag control according to the second embodiment of the present invention.

FIG. 19 is a flow chart showing the airbag control according to the second embodiment of the present invention. The difference between this flow chart and FIG. 18 described above will be explained below. That is, if it is determined in step S17 or S20 that the sensor output indicates "front-facing C.S detection", the front-side airbag 3 is permitted to inflate and the side airbag 4A is inhibited from inflating in step S22.

Since other arrangements are the same as those in the first embodiment, a detailed description thereof will be omitted.

Third Embodiment

The third embodiment of the present invention will be described below.

Figure 12:
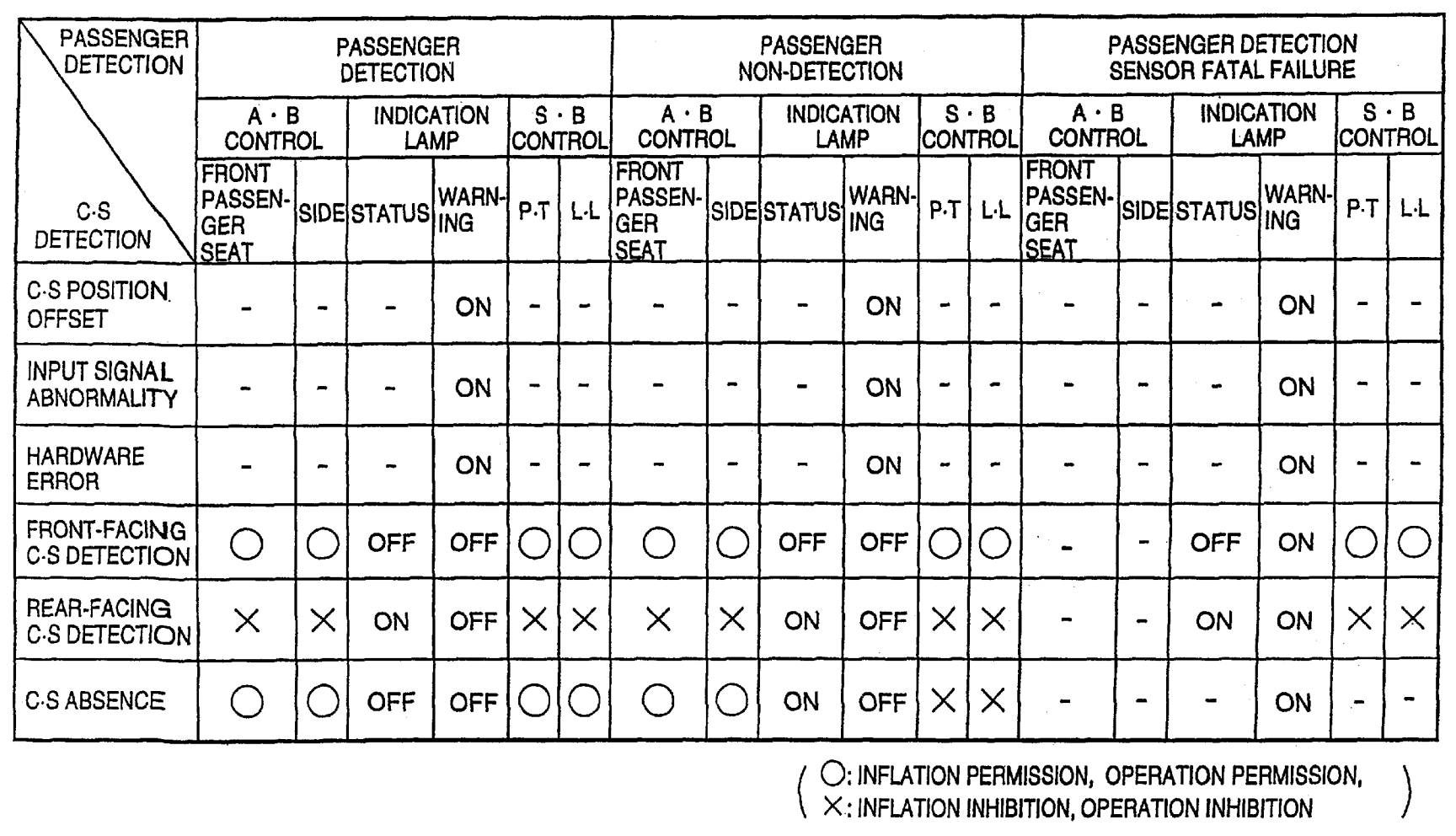

FIG. 12 is a table for explaining control according to the third embodiment of the present invention. In this embodiment, when the control unit 11 detects that one of "C.S position offset", "input signal abnormality", "hardware error", and failure of the passenger detection sensor 133 has occurred at the child seat 12, the airbags, indication lamps, and seatbelts are controlled on the basis of the sensor states one cycle before that state has been detected. That is, this embodiment is directed to attaining fail safe by controlling the airbags, indication lamps, and seatbelts by adopting the sensor states one cycle before, since the actual state is rarely different from the sensor states one cycle before an abnormal state, even when the abnormal state has occurred when the child seat 12 is attached to the front passenger seat 13. In FIG. 12, the columns of "C.S position offset", "input signal abnormality", and "hardware error" are indicated by indefinite states.

The processing of this embodiment will be described below with reference to FIGS. 20, 24, and 28.

Figure 20:
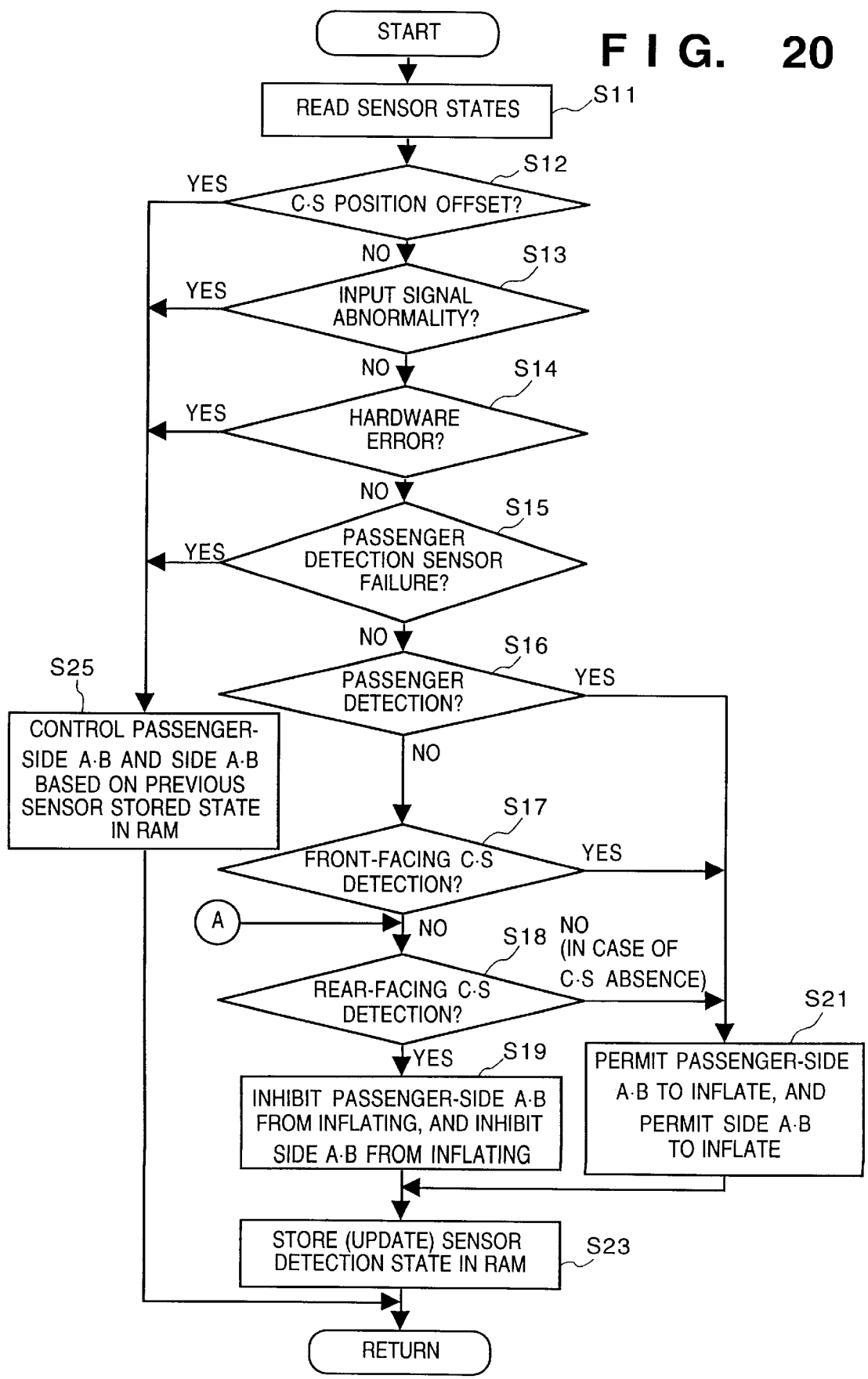
FIG. 20 is a flow chart showing airbag control according to the third embodiment of the present invention.

FIG. 20 is a flow chart showing the airbag control according to the third embodiment of the present invention. The difference between this flow chart and FIG. 18 described above will be explained below. That is, every time the control states of the passenger-side airbag 3 and side airbag 4A are determined in step S19 or S21, the individual sensor states are stored (updated) at predetermined addresses on the RAM 106 in the control unit 11 in step S23. If one of "C.S position offset", "input signal abnormality", "hardware error", and failure of the passenger detection sensor 133 has occurred, the contents at the predetermined addresses on the RAM 106 are referred to and the passenger-side airbag 3 and side airbag 4A are controlled on the basis of the stored previous sensor states in step S25.

Figure 24:
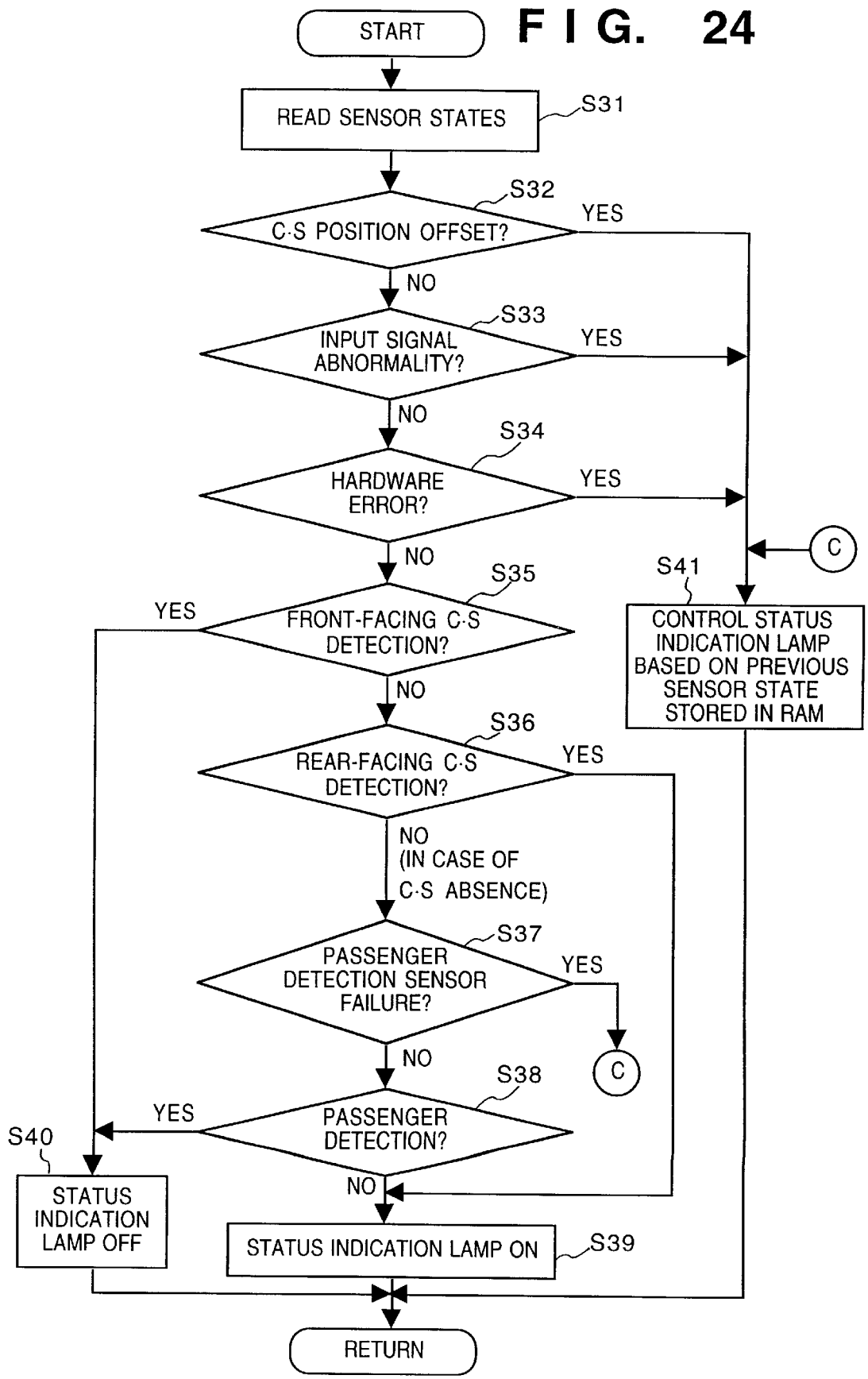
FIG. 24 is a flow chart showing status indication lamp control according to the third embodiment of the present invention.

FIG. 24 is a flow chart showing the status indication lamp control according to the third embodiment of the present invention. The difference between this flow chart and FIG. 21 described above will be explained below. If one of "C.S position offset", "input signal abnormality", "hardware error", and failure of the passenger detection sensor 133 has occurred, the contents at the predetermined addresses on the RAM 106 are referred to and the status indication lamps 151 and 153 are ON/OFF-controlled on the basis of the stored previous sensor states in step S41.

Figure 28:
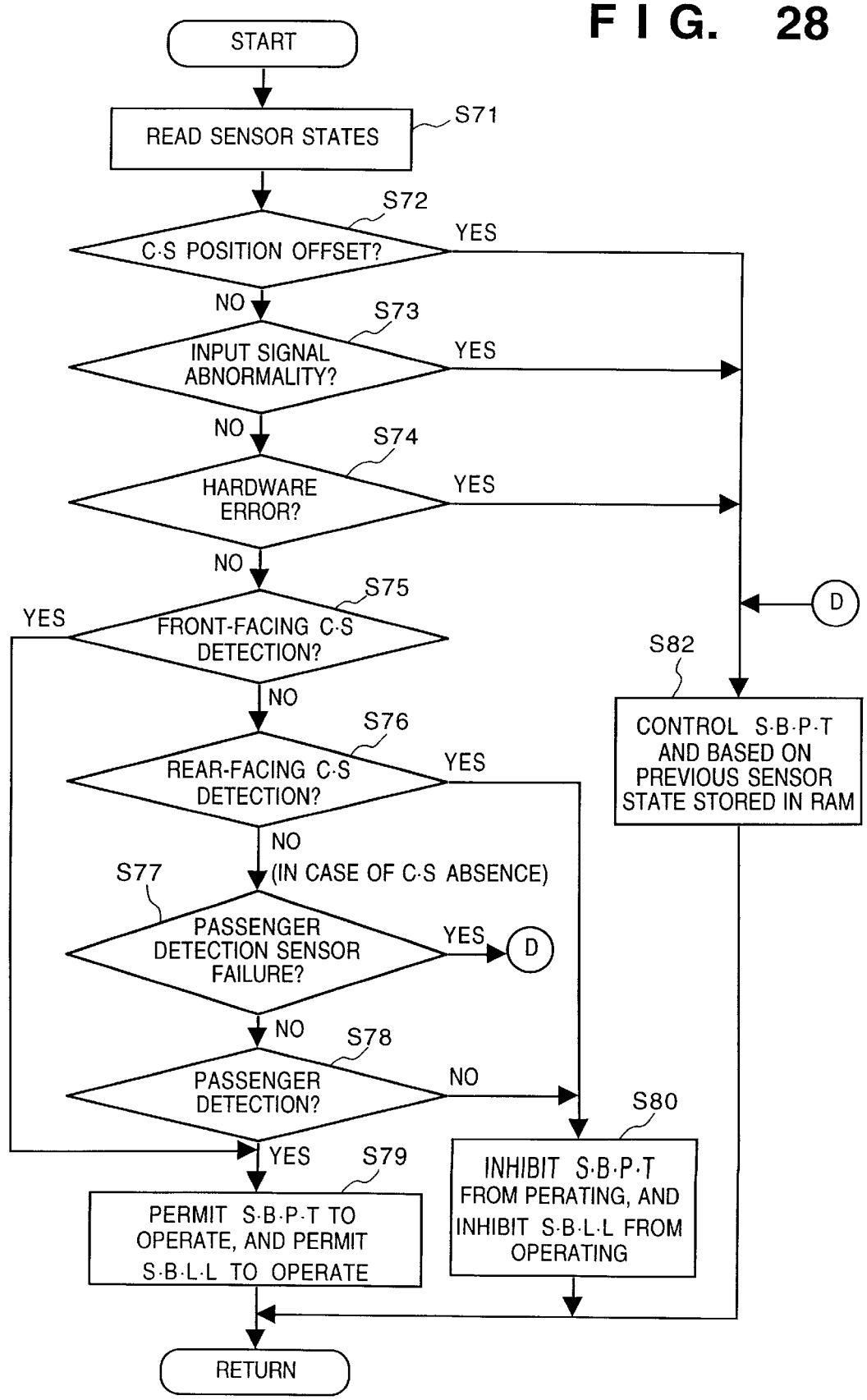
FIG. 28 is a flow chart showing the seatbelt control according to the third embodiment of the present invention.

FIG. 28 is a flow chart showing the status indication lamp control according to the third embodiment of the present invention. The difference between this flow chart and FIG. 26 described above will be explained below. If one of "C.S position offset", "input signal abnormality", "hardware error", and failure of the passenger detection sensor 133 has occurred, the contents at the predetermined addresses on the RAM 106 are referred to and seatbelt pretensioner and seatbelt load limiter are controlled on the basis of the stored previous sensor states in step S82.

Since other arrangements are the same as those in the first embodiment, a detailed description thereof will be omitted.

Modification of Third Embodiment

A modification of the third embodiment will be described below with reference to FIG. 33. In this modification, as interrupt processing for the above-mentioned airbag control shown in FIG. 20, after the processing is started by turning on the ignition key, the airbags (or the passenger-side airbag 3 and side airbag 4A alone) equipped in the automobile 1 may be inhibited from inflating until failure diagnosis of the individual sensors is complete. This is to cope with the fact that previous detection values of the sensors cannot be obtained in the initial state immediately after the ignition key is turned on.

Figure 33:
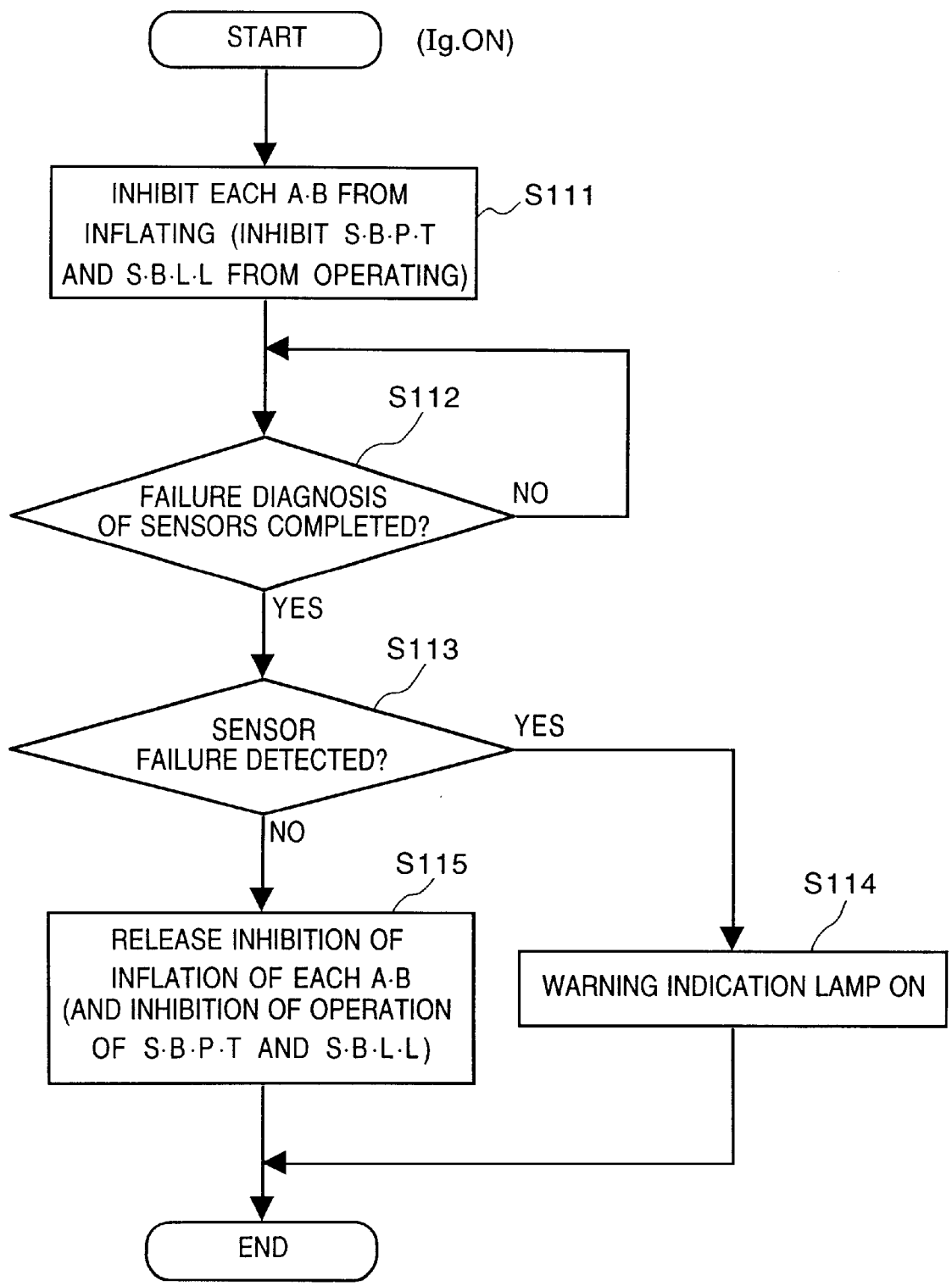
FIG. 33 is a flow chart showing the interrupt processing for the airbag control according to a modification of the third embodiment of the present invention.

FIG. 33 is a flow chart showing the interrupt processing for the airbag control according to the modification of the third embodiment of the present invention.

In FIG. 33, when the processing is started by turning on the ignition key, the control unit 11 inhibits the airbags equipped in the automobile 1 from inflating (step S111), and checks if the first failure diagnosis of the individual sensor is complete (step S112). If YES in step S112, the control unit 11 checks if any sensor failure has been detected (step S113). If YES in step S113, the control unit 11 turns on the warning indication lamp 152 (step S114), and the flow returns. On the other hand, if NO in step S113, the control unit 11 cancels the inflation inhibition state of the airbags (step S115), thus ending the processing.

In this modification, in place of the processing contents in step S112 in FIG. 33, the control unit 11 may check an elapse of a predetermined period of time to obtain another effect. In general, since the states of passengers (including attachment of the child seat 12) in the vehicle are likely to change before a certain period of time elapses after the ignition key is ON, a problem in terms of safety may be posed if the airbags are permitted to inflate in such state.

Since other arrangements are the same as those in the third embodiment, a detailed description thereof will be omitted.

When the elapse of the predetermined period of time is checked in step S112 in FIG. 33, such interrupt processing may be adopted not only in the airbag control (FIG. 20) according to the third embodiment, but also in airbag control in other embodiments. Also, the interrupt processing may also be applied to the seatbelt control to improve safety.

Fourth Embodiment

The fourth embodiment of the present invention will be described below.

FIG. 13 is a table for explaining control according to the fourth embodiment of the present invention. In this embodiment, unlike the first embodiment, when no child seat 12 is attached to the front passenger seat 13 and the passenger detection sensor 113 does not detect any passenger, the passenger-side airbag 3 and side airbag 4A are preferably inhibited from inflating to reduce the repair frequency due to unnecessary inflation. Hence, in such case, the status indication lamps 151 and 153 are not turned on to make passengers (especially, a driver) concentrate on driving. On the other hand, when no child seat 12 is attached to the front passenger seat 13 and the passenger detection sensor 113 has failed, if a passenger is actually sitting in the front passenger seat, such state is coped with by the warning indication lamp 152.

Figure 22:
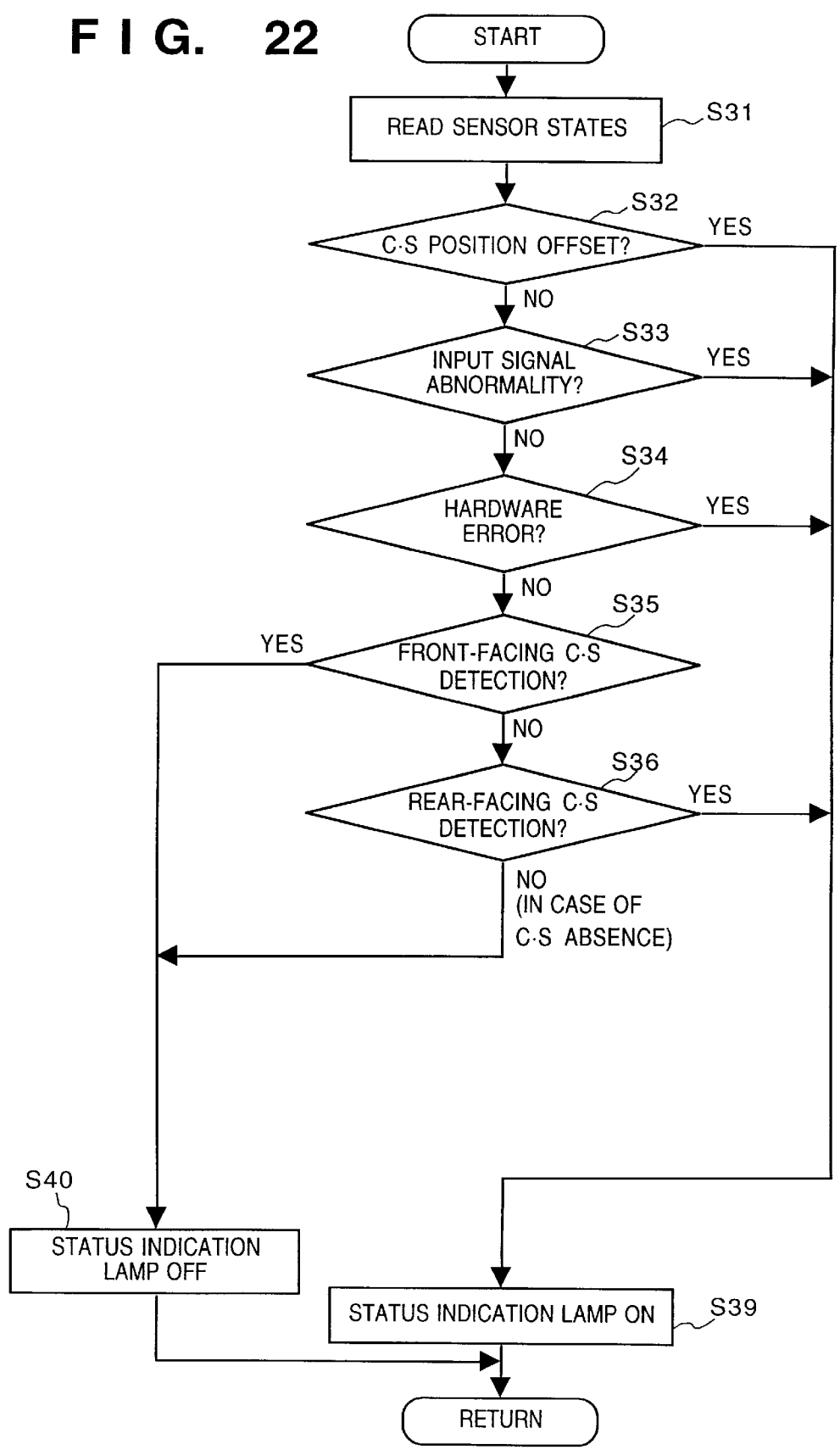
FIG. 22 is a flow chart showing status indication lamp control according to the fourth embodiment of the present invention.

FIG. 22 is a flow chart showing the status indication lamp control according to the fourth embodiment of the present invention. The difference between this flow chart and FIG. 21 described above will be explained below. If NO is determined in step S36, i.e., if the sensor output does not indicate "rear-facing C.S detection", since such state corresponds to "C.S absence", the control unit 11 turns off the status indication lamps 151 and 153 in step S40 irrespective of the detection state of the passenger detection sensor 133.

Since other arrangements are the same as those in the first embodiment, a detailed description thereof will be omitted.

Fifth Embodiment

The fifth embodiment of the present invention will be described below.

FIG. 14 is a table for explaining control according to the fifth embodiment of the present invention. This embodiment improves the idea of the fourth embodiment above, and is directed to further reduction of ON frequencies of the status indication lamps 151 and 153 to make passengers (especially, a driver) concentrate on driving. For this purpose, only when the child seat 12 is attached facing rear to the front passenger seat 13 and the passenger detection sensor 133 has not failed, the control unit 11 turns on the status indication lamps 151 and 153 (when the child seat 12 is attached facing rear to the front passenger seat 13 and the passenger detection sensor 133 has failed, the status indication lamps 151 and 153 may be turned on).

Figure 23:
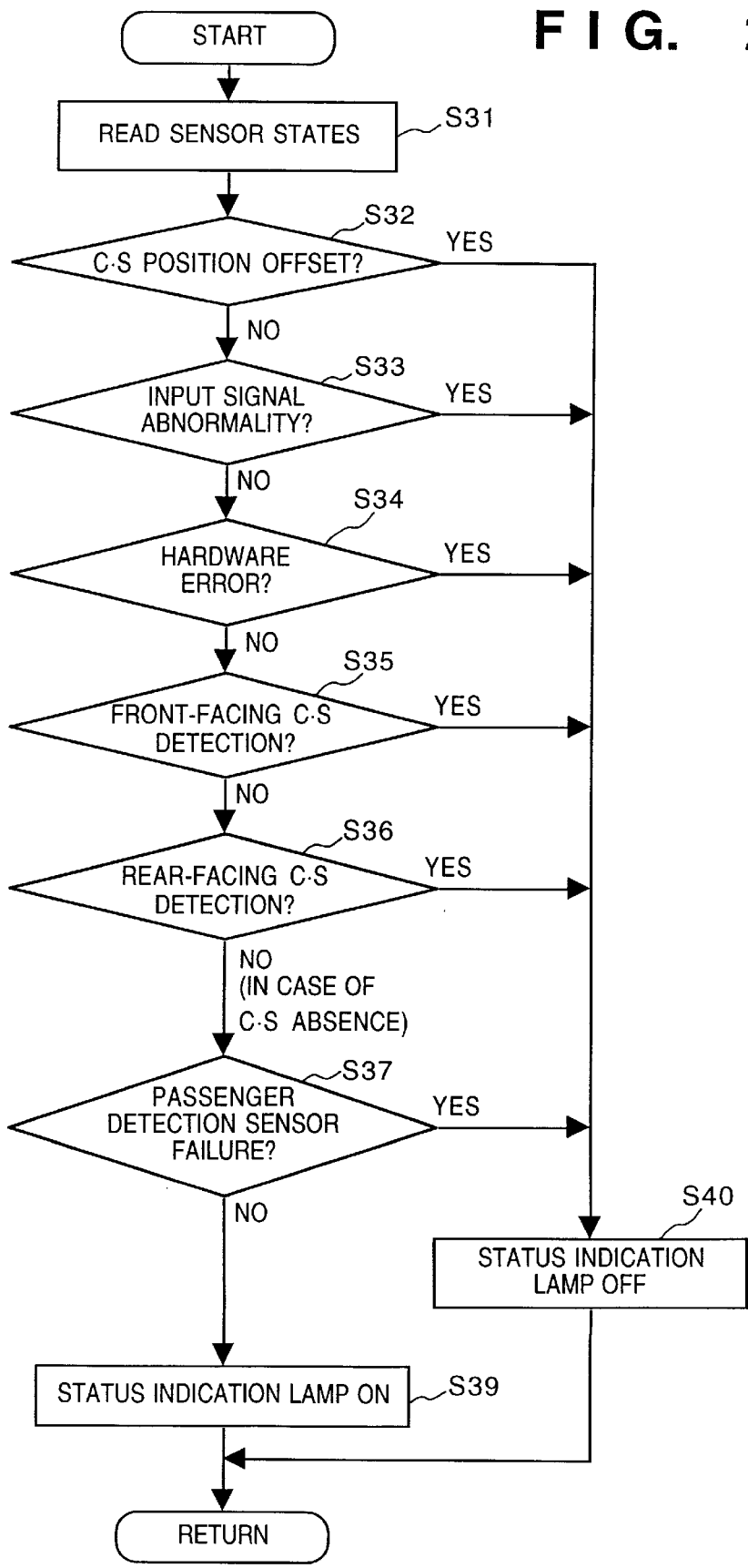
FIG. 23 is a flow chart showing status indication lamp control according to the fifth embodiment of the present invention.

FIG. 23 is a flow chart showing the status indication lamp control according to the fifth embodiment of the present invention.

In FIG. 23, when the processing is started by turning on the ignition key, the control unit 11 reads the states of the individual sensors (step S31). If one of "C.S position offset", "input signal abnormality", "hardware error", and "front-facing C.S detection" is detected in steps S32 to S35, the control unit 11 turns off the status indication lamps 151 and 153 (step S40), and the flow returns. On the other hand, if NO in step S35, the control unit 35 checks if "rear-facing C.S detection" has been detected (step S36.). If NO in step S36, the flow advances to step S40 above. On the other hand, if YES in step S36, the control unit 11 checks if the passenger detection sensor has failed (step S37). If YES in step S37, the flow advances to step S40 above; otherwise, the control unit 11 turns on the status indication lamps 151 and 153 in step S39. After that, the flow returns.

Since other arrangements are the same as those in the first embodiment, a detailed description thereof will be omitted.

Sixth Embodiment

The sixth embodiment of the present invention will be described below.

FIG. 15 is a table for explaining control according to the sixth embodiment of the present invention. In this embodiment, when the state shown in FIG. 17A described above is detected, i.e., when the child seat 12 is attached facing front, the seatbelt pretensioner is inhibited from operating irrespective of the state of the passenger detection sensor 133. This is because the child seat 12 itself has the seatbelts 122 and no problem associated with safety is posed if the passenger-side airbag 3 and seatbelt load limiter normally operate.

Figure 27:
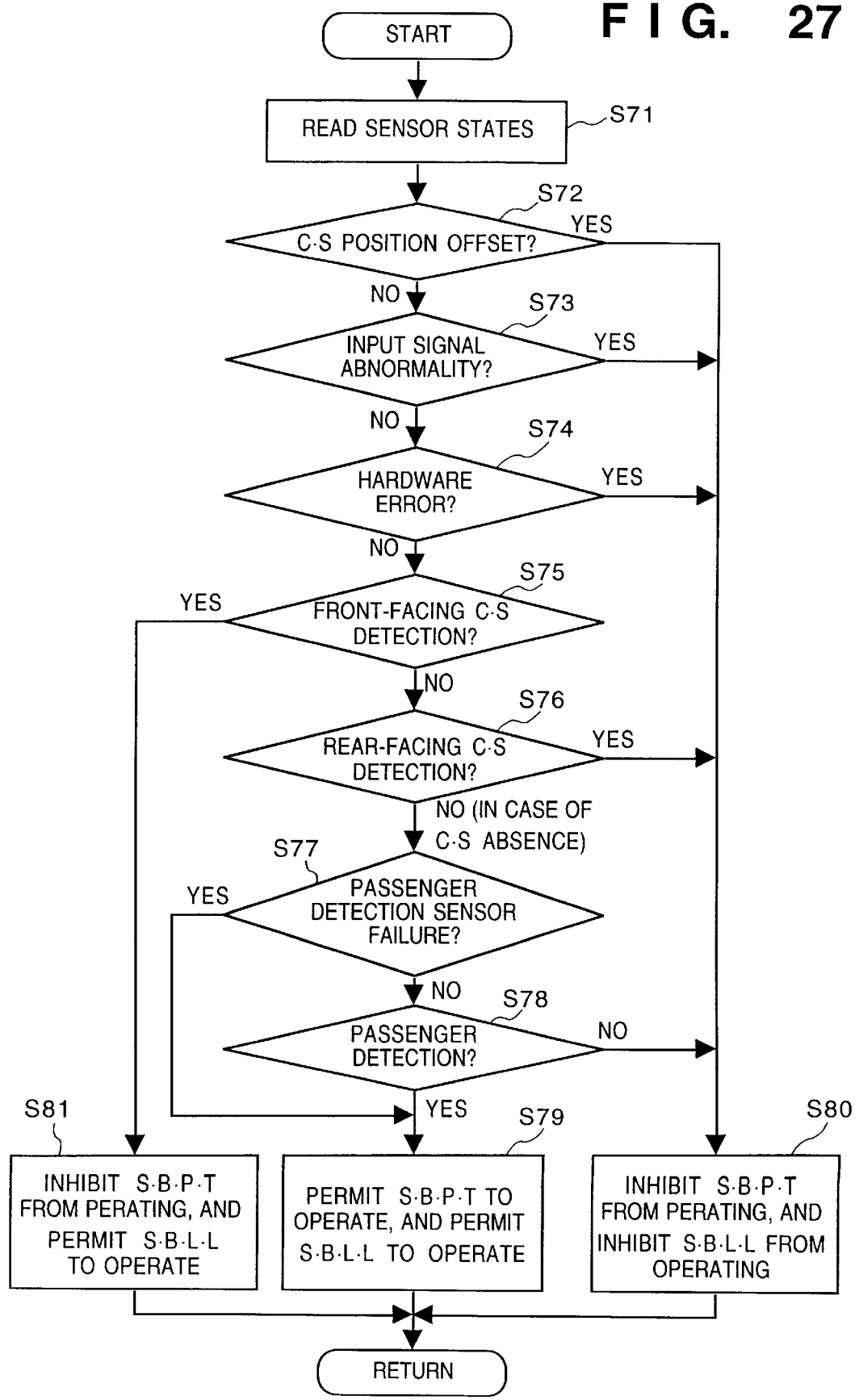
FIG. 27 is a flow chart showing seatbelt control according to the third embodiment of the present invention.

FIG. 27 is a flow chart showing the seatbelt control according to the sixth embodiment of the present invention. The difference between this flow chart and FIG. 26 described above will be explained below. If "front-facing C.S detection" is determined in step S75, the seatbelt pretensioner is inhibited from operating, and the seatbelt load limiter is permitted to operate in step S81.

Since other arrangements are the same as those in the first embodiment, a detailed description thereof will be omitted.

Seventh Embodiment

The seventh embodiment of the present invention will be described below. This embodiment improves the idea of the fourth and fifth embodiments above, and is directed to further reduction of ON frequencies of the status indication lamps 151 and 153 to make passengers (especially, a driver) concentrate on driving. For this purpose, when status has changed in the ON/OFF control of the status indication lamps 151 and 153, the lamps are actually turned on for a predetermined period of time (when the lamps are switched from ON to OFF, the lamps are turned off after they flicker for a predetermined period of time).

Figure 29:
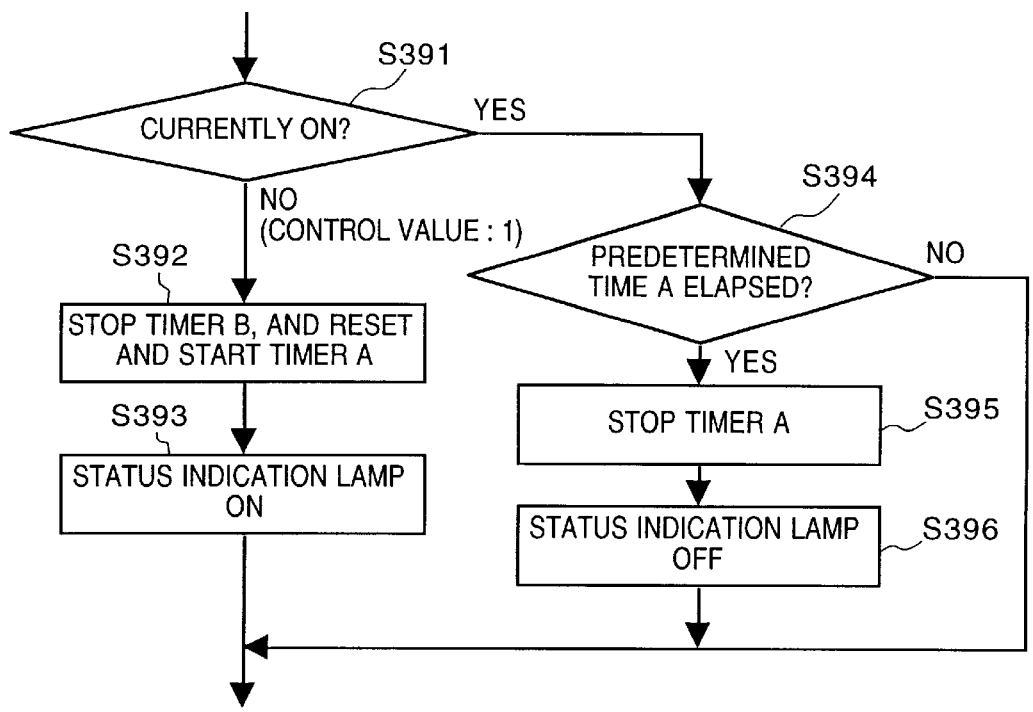
FIG. 29 is a flow chart showing status indication lamp ON control according to the seventh embodiment of the present invention.

FIG. 29 is a flow chart showing the ON control of the status indication lamps according to the seventh embodiment of the present invention, and corresponds to step S39 in FIGS. 21 to 24 above.

In FIG. 29, it is checked in step S391 if the status indication lamps are currently ON. If NO in step S391 (in this case, the control value of the CPU 101 is "1" indicating OFF), after timer A for measuring the ON time of the status indication lamps is reset and started and timer B for measuring the flickering time is stopped, the status indication lamps are turned on (steps S392 and S393).

On the other hand, if it is determined in step S391 that the status indication lamps are currently ON, it is checked if timer A has measured predetermined time A (step S394). If YES in step S394, after timer A is stopped, the status indication lamps are turned off (steps S395 and S396).

Figure 30:
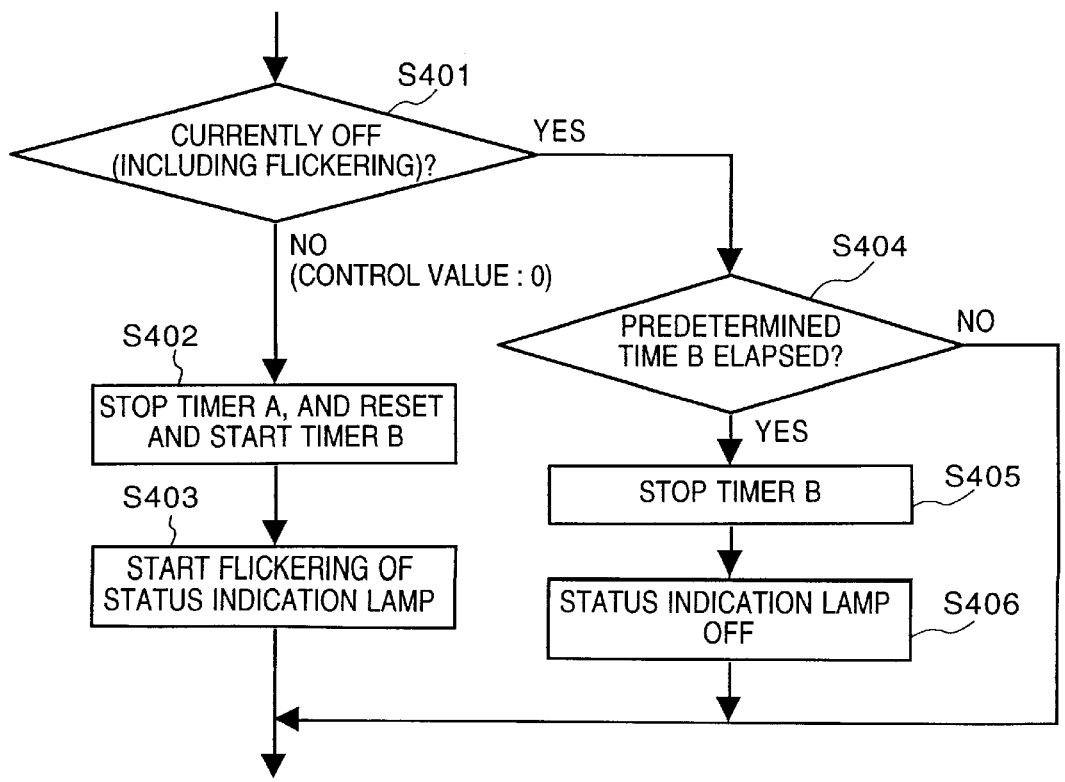
FIG. 30 is a flow chart showing status indication lamp OFF control according to the seventh embodiment of the present invention.

FIG. 30 is a flow chart showing the OFF control of the status indication lamps according to the seventh embodiment of the present invention, and corresponds to step S40 in FIGS. 21 to 24 above.

In FIG. 30, it is checked in step S401 if the status indication lamps are currently OFF (including flickering). If NO in step S401 (in this case, the control value of the CPU 101 is "0" indicating ON), after timer B for measuring the flickering time of the status indication lamps is reset and started and timer A for measuring the ON time is stopped, the status indication lamps begin to flicker (steps S402 and S403).

On the other hand, if it is determined in step S401 that the status indication lamps are currently OFF, it is checked if timer B has measured predetermined time B (step S404). If YES in step S404, after timer B is stopped, the status indication lamps are turned off (steps S405 and S406).

Since other arrangements are the same as those in the first embodiment, a detailed description thereof will be omitted. Note that this embodiment need not be applied to the status indication lamp 153 on the front passenger seat side, needless to say. After the processing in FIG. 29 or 30 is complete and the status indication lamps are turned off, the lamps may be periodically turned on or made to flicker. In this embodiment, the status indication lamps 151 and 153 are turned on/off in accordance with a status indication signal. Alternatively, each lamp may be of dual-lamp type, and one of these lamps may be turned on depending on the status indication signal.

Eighth Embodiment

The eighth embodiment of the present invention will be explained below. In the seventh embodiment described above, after the status indication lamps are turned on or made to flicker by the processing in FIG. 29 or 30 upon detecting changes in sensor state, the status indication lamps are kept OFF unless the sensor states change again. Hence, in this embodiment, the passenger can confirm the current state of the status indication lamps by himself or herself.

Figure 31:
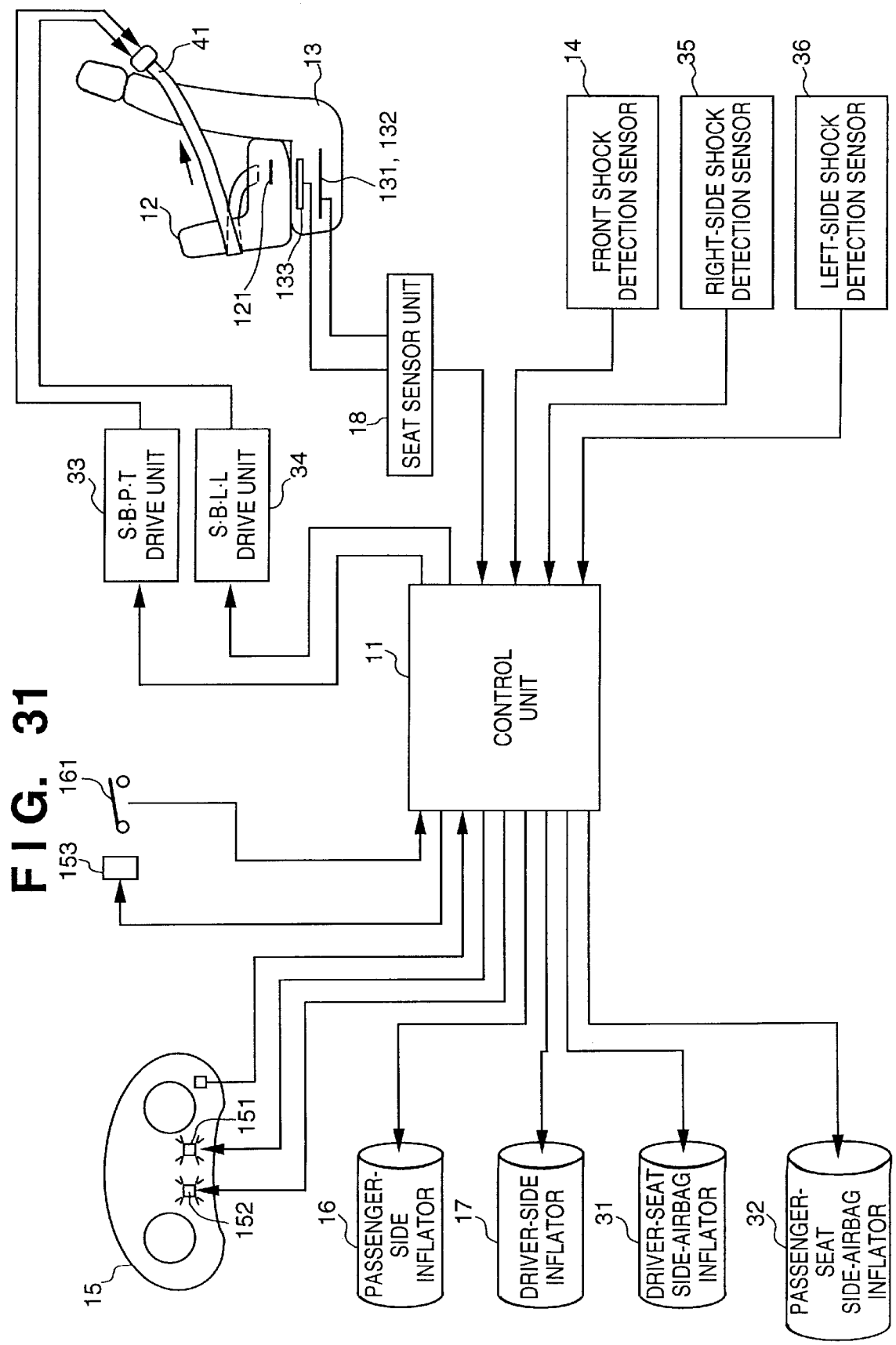
FIG. 31 is a schematic diagram showing the arrangement of an airbag system according to the eighth embodiment of the present invention.

FIG. 31 is a schematic diagram showing the arrangement of the airbag system according to the eighth embodiment of the present invention. The difference between FIGS. 31 and 1 is that a status confirmation switch 161 for a driver and a status confirmation switch 162 for a passenger sitting in the front passenger seat are equipped, and signals are individually supplied to the status indication lamps 151 and 153.

Figure 32:
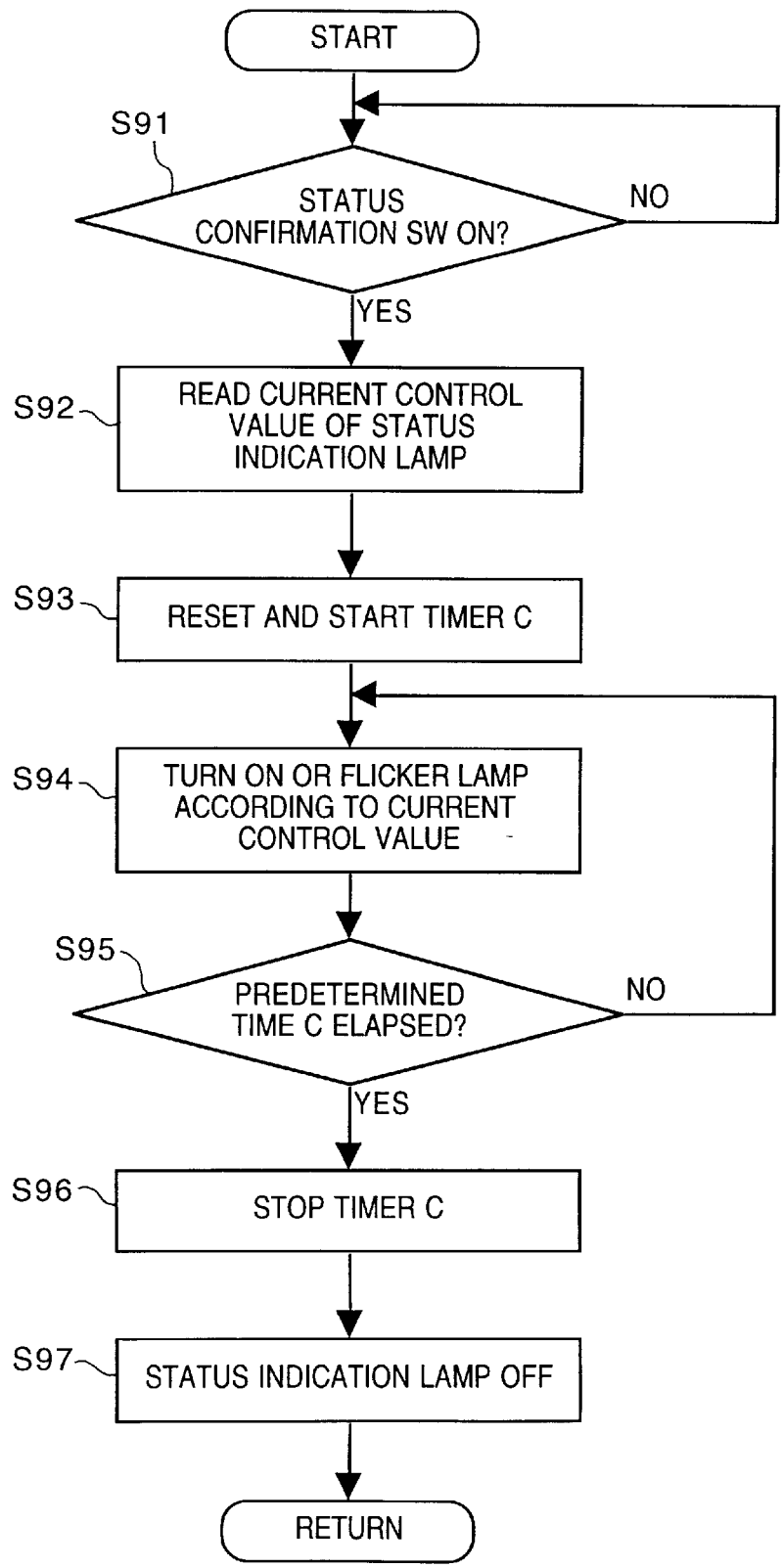
FIG. 32 is a flow chart showing status indication confirmation processing according to the eighth embodiment of the present invention.

FIG. 32 is a flow chart showing the confirmation processing of the status indication lamps according to the eighth embodiment of the present invention, and this processing is executed by the control unit 11.

In FIG. 32, when the processing is started by turning on the ignition key, the control unit 11 checks if the status confirmation switch 161 or 162 has been pressed (step S91).

If YES in step S91, the control unit 11 reads the current control value of the status indication lamps in the CPU 101 (step S92), and resets and starts timer C for measuring the predetermined ON or flickering time of the status indication lamps (step S93). After that, the control unit 11 turns on or flickers the status indication lamps in accordance with the current control value (step S94). After an elapse of predetermined time C, the control unit 11 stops timer C and turns off the status indication lamp and the flow returns (steps S95 to S97).

In a preferred embodiment, the confirmation processing shown in FIG. 32 above is preferably done independently for the status indication lamp 151 upon operation of the status confirmation switch 162 and for the status indication lamp 153 upon operation of the status confirmation switch 161. When the status indication lamp 151 on the driver seat side begins to be ON (flicker) upon depression of the status confirmation switch 161 on the front passenger seat side, the concentration of the driver on driving may lower. With such arrangement, the status indication lamps 151 and 153 are interlocked when they are turned on (made to flicker) upon detecting changes in sensor state.

For example, indications according to each of the above embodiments may be done by the status indication lamp 151, and the status indication lamp 153 may indicate the inflation permission/inhibition state of the passenger-side airbag.

Note that the above embodiments have been described on the basis of the first embodiment for the sake of simplicity. However, the present invention is not limited to such specific arrangement, and an arrangement as an appropriate combination of embodiments based on another embodiment falls within the scope of the present invention.

As described above, according to the embodiments described above, an airbag system and a passenger restraint system for a vehicle, which can realize safety-guaranteed, appropriate inflation & operation control even when the passenger state cannot be detected can be provided. More specifically, when the detection state of the child seat at the front passenger seat or that of the passenger detection sensor has become abnormal, the airbags, indication lamps, and seatbelts are controlled on the basis of the sensor states before that state has been detected. With this control, high fail safe performance can be assured even upon occurrence of an abnormality.

As many apparently widely different embodiments of the present invention can be made without departing from the spirit and scope thereof, it is to be understood that the invention is not limited to the specific embodiments thereof except as defined in the appended claims.

What is claimed is:

1. A control apparatus for an airbag of a vehicle, comprising:

a state detection sensor to detect a presence or absence of a passenger at a vehicle seat in accordance with an output of a passenger detection sensor;

a control unit to inhibit an airbag for the vehicle seat from inflating when an absence of a passenger at the vehicle seat is detected in accordance with the detected result of the state detection sensor; and failure detection means for detecting a failure of the passenger detection sensor and informing the failure state to said control unit;

wherein the failure of the passenger detection sensor includes a hardware error of the passenger detection sensor, in which the output of the passenger detection sensor is not input to said state detection sensor, and said control unit holds a control state before failure detection and inhibits the airbag from inflating on the basis of the held control state in response to the informed failure state representing the hardware error of the passenger detection sensor.

2. The control apparatus according to claim 1, wherein said control unit inhibits the airbag from inflating for a predetermined period of time after an ignition switch of the vehicle is turned on.

3. The control apparatus according to claim 2, wherein the predetermined period of time is required for detecting whether or not the sensor has failed.

4. The control apparatus according to claim 1, further comprising:

an indication lamp to indicate the failure state of the passenger detection sensor, wherein said control unit turns on the indication lamp in response to said failure detection means detecting the failure of the passenger detection sensor.

5. The control apparatus according to claim 1, further comprising:

a child seat detecting sensor to detect attachment of a child seat to the vehicle seat;

wherein said control unit also controls an operation of a seatbelt pretensioner or a seatbelt load limiter for the vehicle seat, said control unit holds a control state before failure detection and controls the seatbelt pretensioner or the seatbelt load limiter from operating on the basis of the held control state in response to the informed failure state representing the hardware error of the passenger detection sensor, and said control unit inhibits the seatbelt pretensioner or the seatbelt load limiter from operating on the basis of the held control state in response to detection of attachment of the child seat on the vehicle seat in accordance with an output of the child seat detecting sensor, and even though the informed failure state represents the hardware error of the passenger detection sensor, said control unit also inhibits the seatbelt pretensioner or the seatbelt load limiter from operating in response to detection of attachment of the child seat on the vehicle seat in accordance with the output of the child seat detecting sensor.

6. The control apparatus according to claim 5, wherein the child seat detecting sensor also detects an attachment direction of the child seat attached on the vehicle seat, said control unit permits the seatbelt pretensioner or the seatbelt load limiter from operating in response to the output of the child seat detecting sensor representing that the attached child seat is facing front of the vehicle, and said control unit also permits the seatbelt pretensioner or the seatbelt load limiter from operating in response to the output of the child seat detecting sensor representing that the attached child seat is facing front of the vehicle even though the informed failure state represents the hardware error of the passenger detection sensor.

7. The control apparatus according to claim 1, wherein said control unit stores and updates the detected result of the state detection sensor in a memory at every control cycle in response to said failure detection means not detecting the failure of the passenger detection sensor, and said control unit reads out the stored previous result of the state detection sensor from the memory and inhibits the airbag from inflating on the basis of the read out result corresponding to the held control state in response to the informed failure state representing the hardware error of the passenger detection sensor.

8. A control apparatus for an airbag on a vehicle, comprising:

a child seat detecting sensor to detect attachment of a child seat on a vehicle seat;

a control unit to inhibit an airbag for the vehicle seat from inflating when the child seat detecting sensor detects attachment of the child seat to the vehicle seat; and failure detection means for detecting a failure of the child seat detecting sensor and informing the detection state to said control unit, wherein the failure of the child seat detecting sensor includes a hardware error of the child seat detecting sensor or a signal abnormality representing that the output of the child seat detecting sensor is out of a predetermined range, and said control unit holds a control state before the failure detection and inhibits the airbag from inflating on the basis of the held control state in response to the informed failure state representing the hardware error or the signal abnormality of the child seat detecting sensor.

9. The control apparatus according to claim 8, wherein the child seat detecting sensor also detects an attachment direction of the child seat attached on the vehicle seat, and said control unit prevents the airbag from inflating when the output of the child seat detecting sensor represents that the attached child seat is facing front of the vehicle.

10. The control apparatus according to claim 8, wherein said control unit inhibits the airbag from inflating for a predetermined period of time after an ignition switch of the vehicle is turned on.

11. The control apparatus according to claim 10, wherein the predetermined period of time is required for detecting whether or not the sensor has failed.

12. The control apparatus according to claim 8, further comprising:

an indication lamp to indicate the failure state of the child seat detecting sensor, wherein said control unit turns on the indication lamp in response to said failure detection means detecting the failure of the child seat detection sensor.

13. The control apparatus according to claim 8, wherein said control unit stores and updates the output of the child seat detecting sensor in a memory at every control cycle when said failure detection means does not detect the failure of the child seat detecting sensor, and said control unit reads out the stored previous output of the child seat detecting sensor from the memory and inhibits the airbag from inflating on the basis of the read out output corresponding to the held control state in response to the informed failure state representing the hardware error or the signal abnormality of the child seat detecting sensor.

14. A control apparatus of a passenger restraint device on a vehicle, comprising:

a state detection sensor to detect a presence or absence of a passenger at a vehicle seat by an output of a passenger detection sensor;

a control unit to inhibit an operation of a seatbelt pretensioner or a seatbelt load limiter for the vehicle seat in response to detection of an absence of a passenger at the vehicle seat in accordance with the detected result of the state detection sensor; and failure detection means for detecting a failure of the passenger detection sensor and informing the failure state to said control unit;

wherein the failure of the passenger detection sensor includes a hardware error of the passenger detection sensor, in which the output of the passenger detection sensor is not input to said state detection sensor, and said control unit holds a control state before failure detection, and inhibits the seatbelt pretensioner or the seatbelt load limiter from operating on the basis of the held control state in response to the informed failure state representing the hardware error of the passenger detection sensor.

15. The control apparatus according to claim 14, wherein said control unit inhibits the seatbelt pretensioner or the seatbelt load limiter from operating for a predetermined period of time after an ignition switch or the vehicle is turned on.

16. The control apparatus, according to claim 15, wherein the predetermined period of time is required for detecting whether or not the sensor has failed.

17. The control apparatus according to claim 14, further comprising:

an indication lamp indicating the failure state of the passenger detection sensor, wherein said control unit turns on the indication lamp in response to said failure detection means detecting the failure of the passenger detection sensor.

18. A control apparatus for a passenger restraint device on a vehicle, comprising:

a child seat detecting sensor to detect attachment of a child seat to a vehicle seat;

a control unit to inhibit a seatbelt pretensioner or a load limiter for the vehicle seat from operating in response to detecting attachment of the child seat on the vehicle seat in accordance with an output of the child seat detecting sensor; and failure detection means for detecting a failure of the child seat detecting sensor and informing the detection state to said control unit, wherein the failure of the child seat detecting sensor includes a hardware error of the child seat detecting sensor or a signal abnormality representing that the output of the child seat detecting sensor is out of a predetermined range, and when the informed failure state represents the hardware error or the signal abnormality of the child seat detecting sensor, said control unit holds a control state before the failure detection, and inhibits the seatbelt pretensioner or the seatbelt load limiter from operating on the basis of the held control state.

19. The control apparatus according to claim 18, wherein the child seat detecting sensor also detects an attachment direction of the child seat attached on the vehicle seat, and said control unit permits the seatbelt pretensioner or the seatbelt load limiter from operating when the output of the child seat detecting sensor represents that the attached child seat is facing front of the vehicle.

20. The control apparatus according to claim 18, wherein said control unit inhibits the seatbelt pretensioner or the seatbelt load limiter from operating for a predetermined period of time after an ignition switch of the vehicle is turned on.

21. The control apparatus according to claim 20, wherein the predetermined period of time is required for detecting whether or not the sensor has failed.

22. The control apparatus according to claim 18, further comprising:

an indication lamp indicating the failure state of the child seat detecting sensor, wherein said control unit turns on the indication lamp in response to said failure detection means detecting the failure of the child seat detection sensor.

23. A passenger protection apparatus for a vehicle having an airbag, comprising:

a child seat detecting sensor to detect attachment of a child seat to a vehicle seat;

a control unit to inhibit an airbag for the vehicle seat from inflating or to inhibit a seatbelt pretensioner or a seatbelt load limiter for the vehicle seat from operating in response to detection of attachment of the child seat to the vehicle seat by the child seat detecting sensor;

position offset detection means for detecting a position offset of the attached child seat against a predetermined area on the vehicle seat and informing the position offset state to said control unit, wherein said control unit holds a control state before the detection of the position offset state and inhibits the airbag from inflating or inhibits the seatbelt pretensioner or the seatbelt load limiter from operating on the basis of the held control state in response to said control unit being informed of the position offset state.

24. The control apparatus according to claim 23, further comprising:

an indication lamp indicating the position offset state of the attached child seat detected by said position offset detection means, wherein said control unit turns on the indication lamp in response to said position offset detection means detecting the position offset state.

* * * * *

UNITED STATES PATENT AND TRADEMARK OFFICE
CERTIFICATE OF CORRECTION

PATENT NO.: 6,116,638
DATED : September 12, 2000
INVENTOR(S): Koji HOSODA

It is certified that error appears in the above-identified patent and that said Letters Patent is hereby corrected as shown below:

Column 5, line 36, change "(S.B.P.T)" to --(S·B·P·T)--;
line 39, change "(S.B.L.L)" to --(S·B·L·L)--.

Column 10, lines 18, 27, 30, and 34, change "C.S" to --C·S-- (all occurrences);
line 57, change "A.B" to A·B--.

Column 11, line 10, change "S.B" to --S·B--;
line 62, change "C.S." to --C·S--.

Column 12, lines 21, 22, 28, 25, 42, 50, 64 and 65, change "C.S" to --C·S-- (all occurrences).

Column 13, lines, 3, 10, 21, 22, 27, 48, 56, 62 and 66, change "C.S" to --C·S-- (all occurrences).

UNITED STATES PATENT AND TRADEMARK OFFICE
CERTIFICATE OF CORRECTION

PATENT NO.:    6,116,638
DATED      :    September 12, 2000
INVENTOR(S):   Koji HOSODA It is certified that error appears in the above-identified patent and that said Letters Patent is hereby corrected as shown below:

Column 14, line 1, change "44" to --4A--;
lines 3, 14, 19, 22, 26, 43, 50 and 63, change "C.S" to --C·S-- (all occurrences).

Column 15, lines 1, 4, 8, 49 and 62, change "C.S" to --C·S-- (all occurrences).

Column 16, lines 6, 19, 28 and 39, change "C.S" to --C·S-- (all occurrences).

Column 17, lines 49 and 50, change "C.S" to --C·S-- (all occurrences).

Column 18, lines 11, 13, 17 and 45, change "C.S" to --C·S-- (all occurrences).

Signed and Sealed this

Eighth Day of May, 2001

Attest:

NICHOLAS P. GODICI

*Attesting Officer*    *Acting Director of the United States Patent and Trademark Office*